May 25, 1965   L. W. FERRIS ETAL   3,185,996
CARD HANDLING AND WRITING APPARATUS
Filed May 15, 1961   14 Sheets-Sheet 1
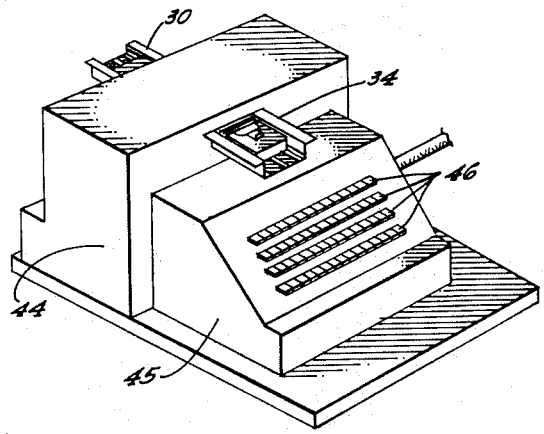
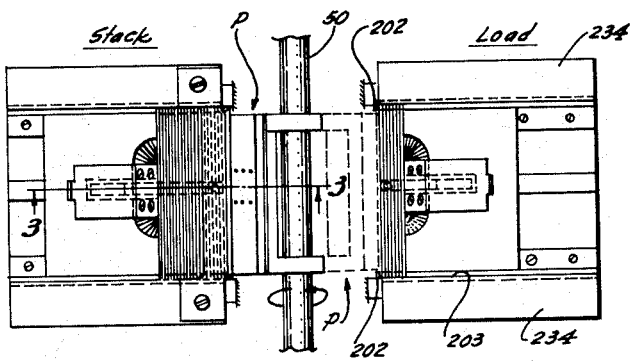
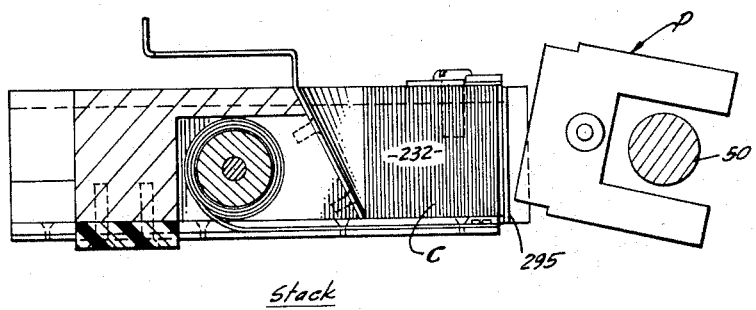
INVENTORS:
Lester W. Ferris
Maurice S. Martin
Smyth, Roston & Pavitt
Attorneys

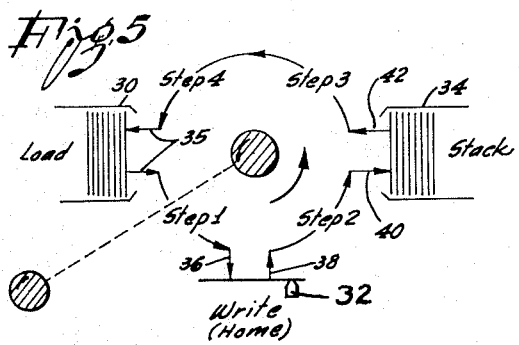
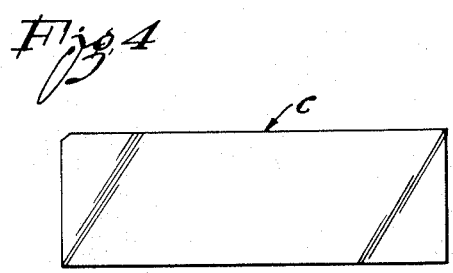
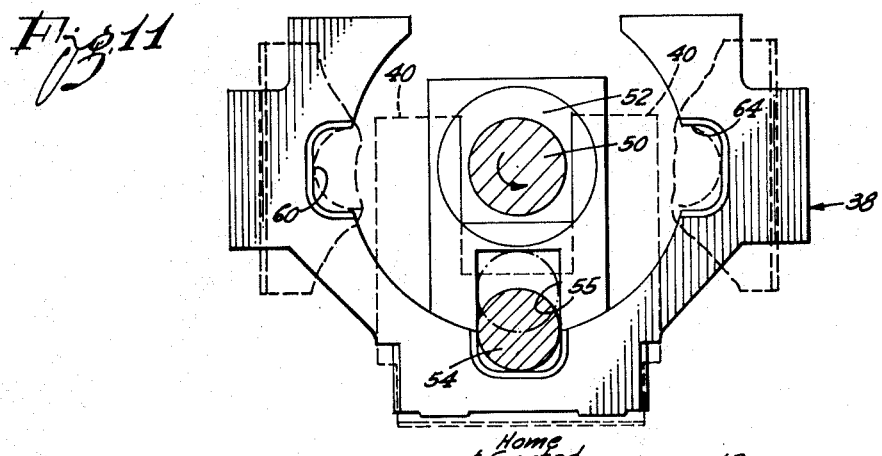
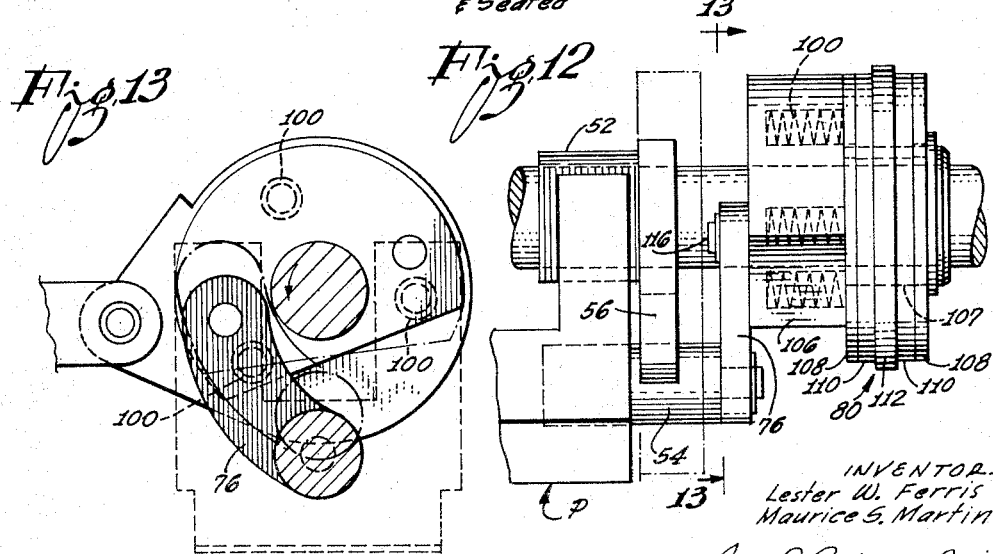

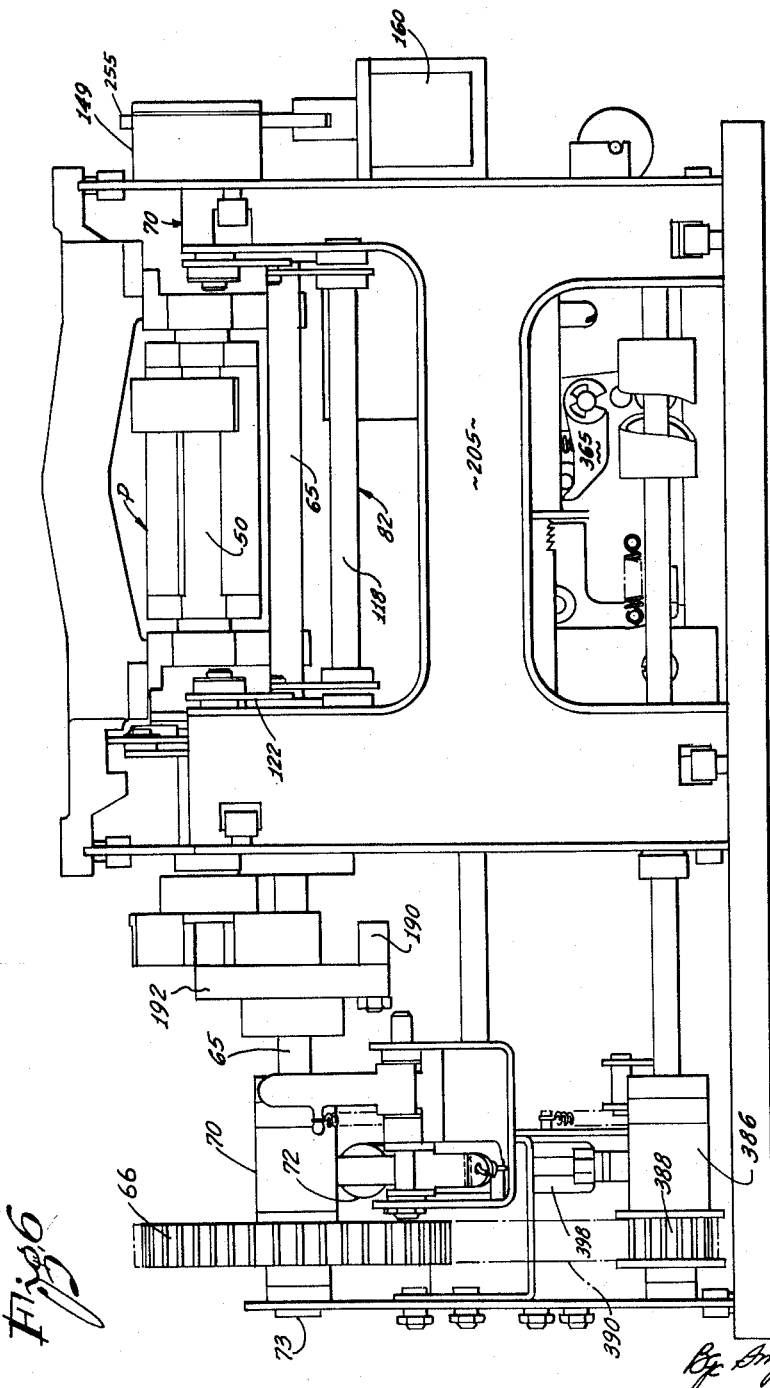

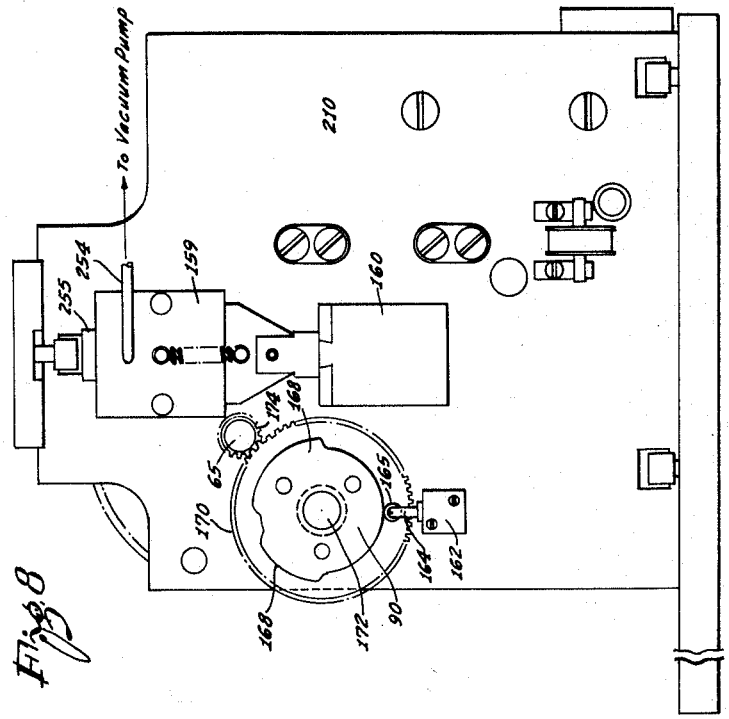
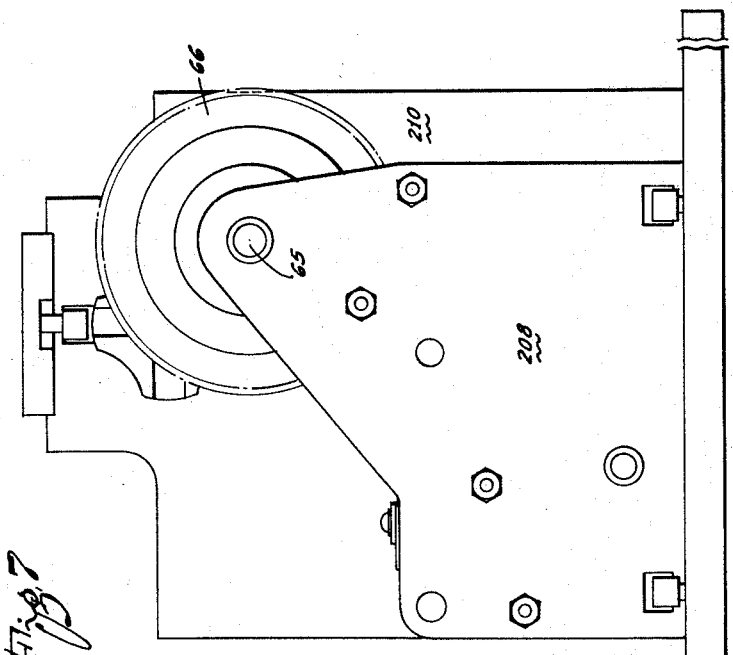

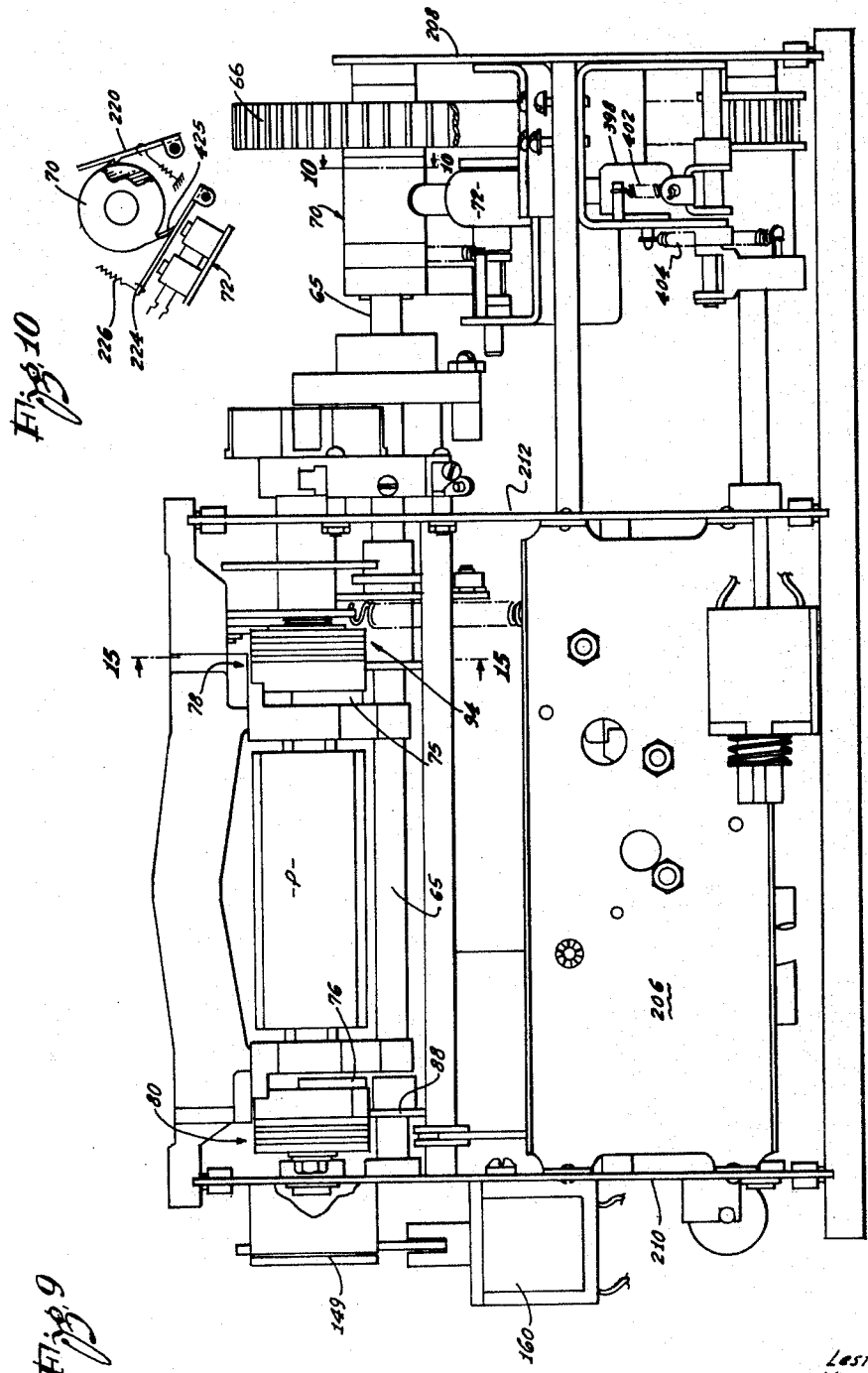

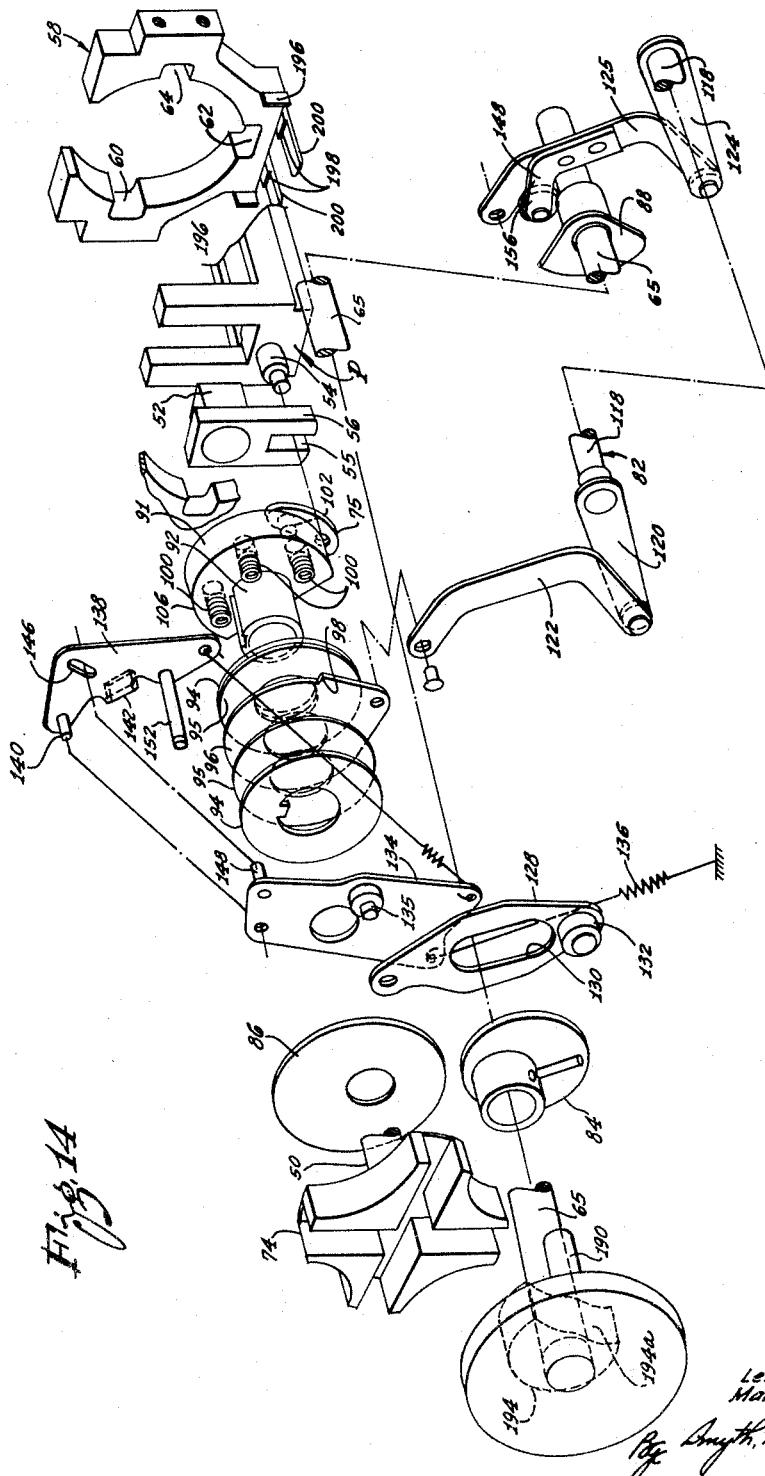

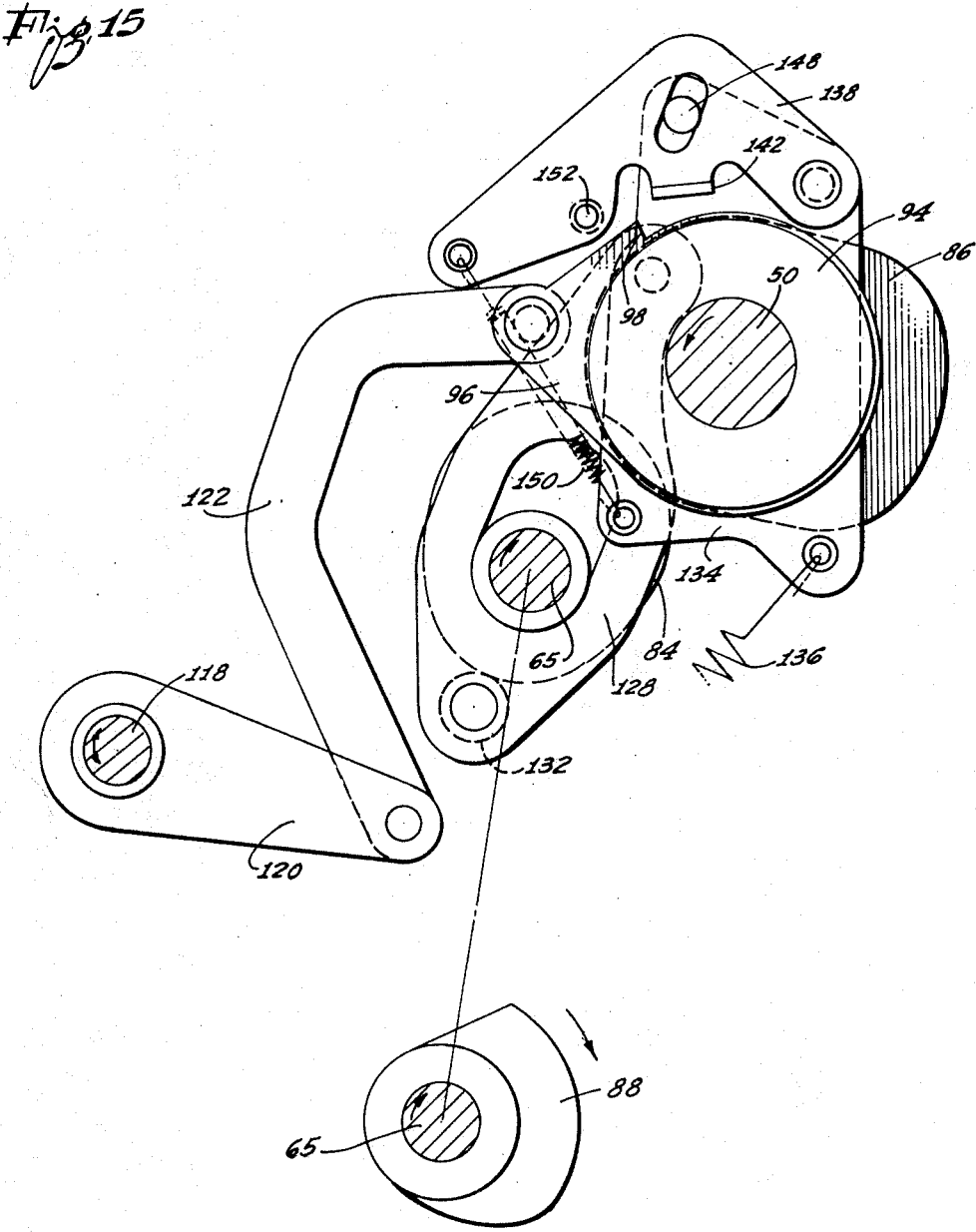

May 25, 1965    L. W. FERRIS ETAL    3,185,996
CARD HANDLING AND WRITING APPARATUS
Filed May 15, 1961    14 Sheets-Sheet 8

INVENTORS:
Lester W. Ferris
Maurice S. Martin

By Smyth, Roston & Pavitt
Attorneys

May 25, 1965    L. W. FERRIS ETAL    3,185,996
CARD HANDLING AND WRITING APPARATUS

Filed May 15, 1961    14 Sheets-Sheet 11

INVENTORS:
Lester W. Ferris
Maurice S. Martin

Attorneys

May 25, 1965 L. W. FERRIS ETAL 3,185,996
CARD HANDLING AND WRITING APPARATUS
Filed May 15, 1961 14 Sheets-Sheet 12
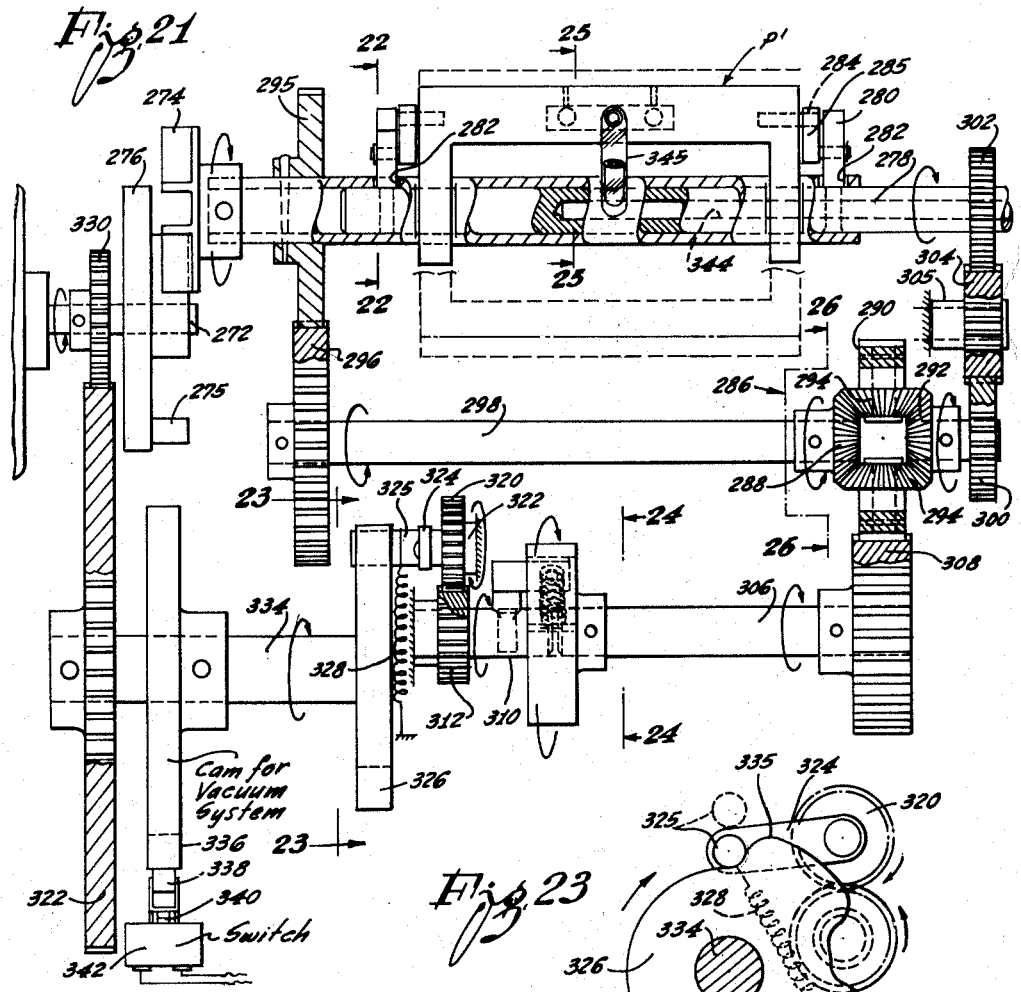
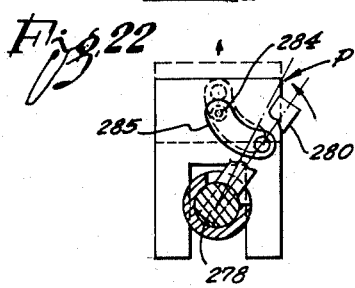
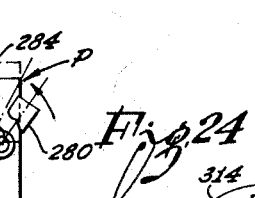
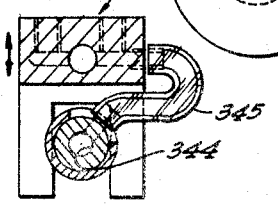
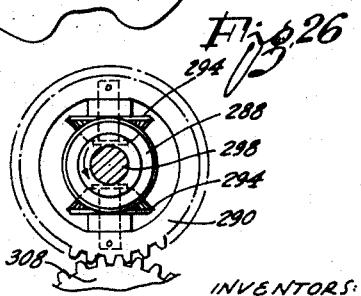
INVENTORS:
Lester W. Ferris
Maurice S. Martin
By Smyth, Rooton & Pavitt
Attorneys May 25, 1965  L. W. FERRIS ETAL  3,185,996
CARD HANDLING AND WRITING APPARATUS
Filed May 15, 1961  14 Sheets-Sheet 13
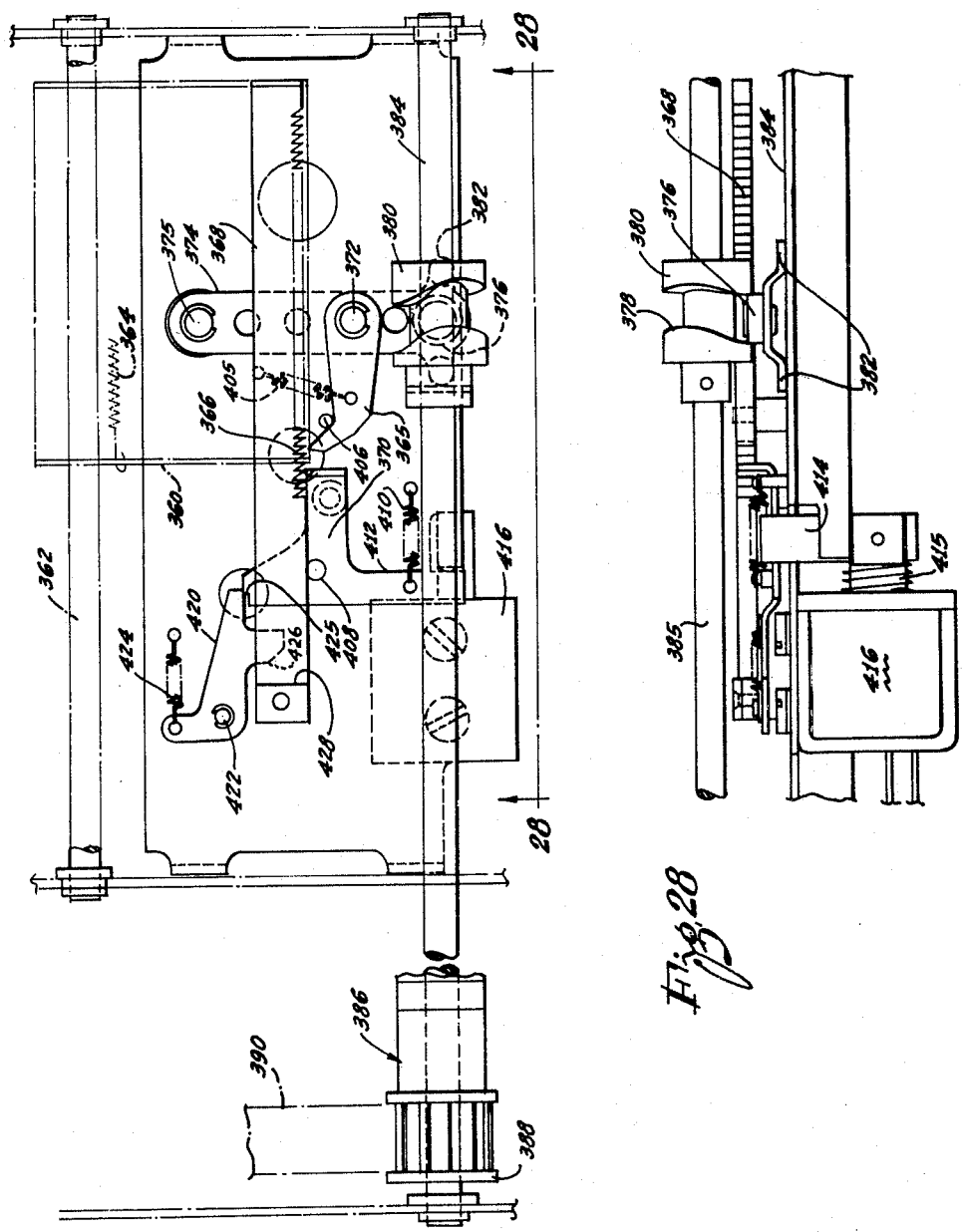
INVENTORS:
Lester W. Ferris
Maurice S. Martin
By Smyth, Rooten & Pavitt
Attorneys

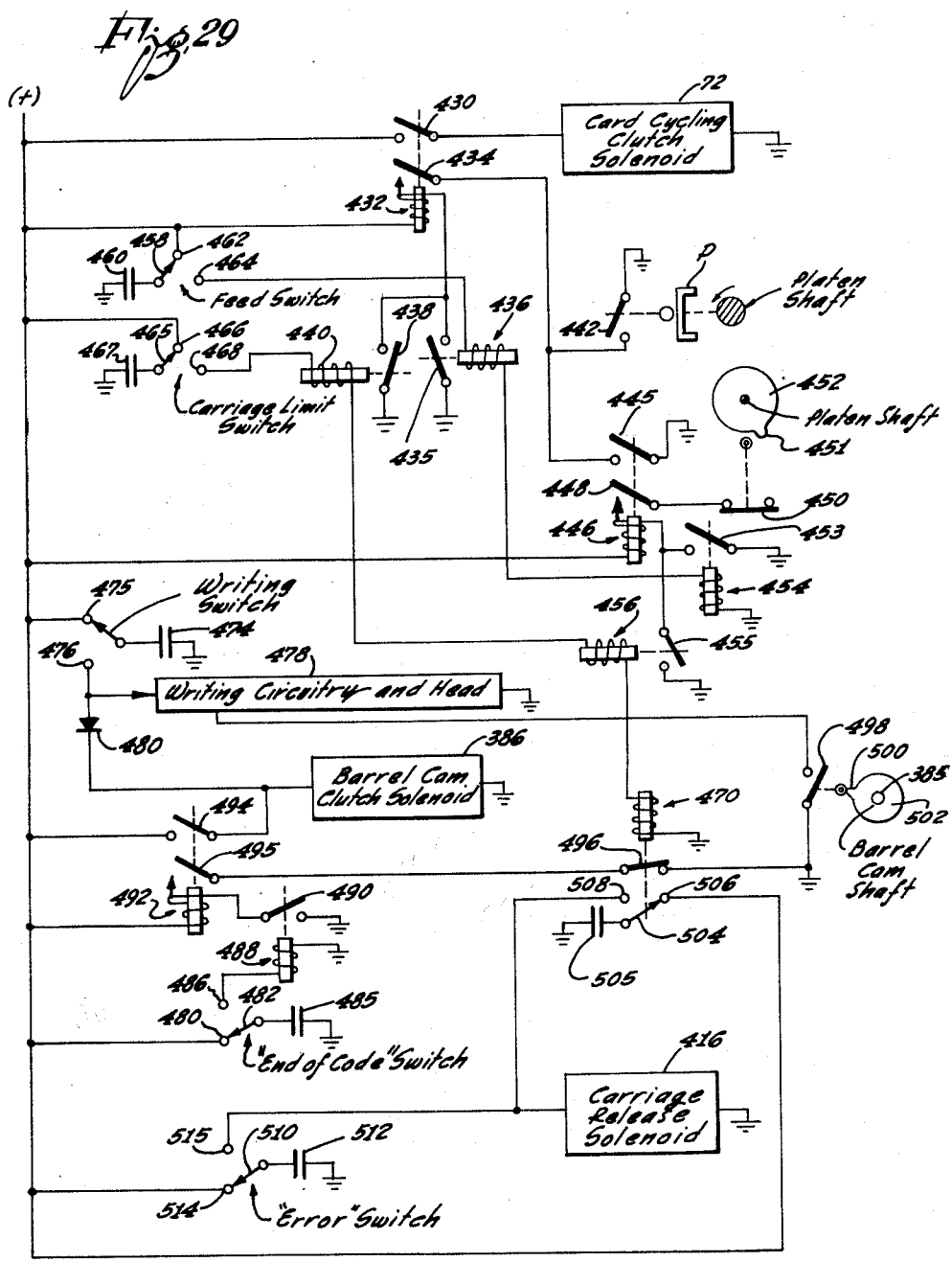

United States Patent Office 3,185,996
Patented May 25, 1965

3,185,996
CARD HANDLING AND WRITING APPARATUS
Lester W. Ferris, Los Angeles, and Maurice S. Martin, Hermosa Beach, Calif., assignors to The Magnavox Company, Torrance, Calif., a corporation of Delaware
Filed May 15, 1961, Ser. No. 109,945
25 Claims. (Cl. 346—22)

This invention relates to an apparatus for expeditiously recording data on cards, which cards are to be stored in a memory bank or interrogation file for use in keeping various records or for making various computations or for carrying out various transactions.

In the initial practice of the invention a six-bit binary code is employed for magnetically recording six-bit letters, numbers and symbols on a 1" x 3" plastic card that has a layer of finely divided ferromagnetic material. This initial embodiment has been selected for the present disclosure and will provide adequate guidance for those skilled in the art who may have occasion to apply the principles of the invention for other specific purposes.

The invention combines an automatic card handling mechanism with a writing mechanism controlled by a keyboard and thus provides a compact self-contained unit that is manually operated by a bank of finger-actuated keys. With a supply of the cards in a conveniently accessible feed magazine, it is merely necessary to press an appropriate key to transport a new card to the writing station. The keyboard controls a transducer means for recording the data, the transducer means advancing step by step from a starting position adjacent one end of the card to a limit or end position adjacent the other end of the card. If an error occurs, an "error" key is pressed to return the transducer means to its starting position.

When a recording on a card is finished, an E.C. key ("end of code" key) is depressed to initiate a rapid automatic chain of actions. First, the transducer means quickly finishes its traverse of the card in a step by step manner and records clock signals on the card at each step. Then, arrival of the transducer means at its limit or end position automatically initiates a full cycle of operation of the card handling mechanism to replace the processed or written card with a new card at the writing station.

The invention solves numerous problems in putting this broad concept into practice. One problem is to provide a card-handling mechanism per se that is efficient, reliable, and of such construction as to unite compactly with a keyboard-actuated writing mechanism. In general this problem is solved by employing a platen which travels cyclically on a rotary means in a vertical orbit and pauses at a feed or loading station, a writing station and a stacking or unloading station in sequence. The platen faces outward of its orbit and during each pulse at a station first shifts outwardly of its orbit to the station and then retracts before traveling to the next station. For compactness the orbit is confined to a small radius and for further compactness the three stations are placed in three quadrants of the orbit, the feed and stacking station being horizontally opposite each other and the writing station being at the bottom of the orbit.

The problem of constructing an efficient, compact mechanism for carrying out this orbital action is solved by mounting the platen in a radially movable manner on what may be termed a platen shaft and by providing an adjacent parallel drive shaft to rotate the platen shaft intermittently by Geneva gearing and to control the radial movements of the platen at the three stations. In the presently preferred embodiment of the invention, the radial movements of the platen are accomplished by cams on the drive shaft in cooperation with what may be termed "friction assemblies" on the platen shaft. In an alternate embodiment, the platen shaft is tubular and the radial movements of the platen are effected by means of a third control shaft inside the tubular platen shaft. The Geneva gearing that is actuated by the main shaft rotates the tubular platen shaft and the third control shaft in unison. Oscillating means actuated by the main shaft is connected to the third shaft by differential gearing for oscillation of the third shaft independently of the tubular platen shaft when the platen is to be reciprocated radially at each of the three stations.

The problem of transferring successive cards from the feed magazine to the platen, of retaining the successive cards on the platen, and of transferring the written cards from the platen to the stacking magazine is met successfully by a unique combination of three features. One feature is the radial reciprocation of the platen at each of the three stations. A second feature is the provision of a pair of retaining shoulders at each magazine to engage the opposite ends of the front card in the magazine in a yielding manner. The third feature is the incorporation of suction means in the platen.

When the platen is extended at the feed station it attracts and holds the front card in the magazine by suction action and then the platen retracts to pull the card outward out of engagement with the two retaining shoulders of the feed magazine. The suction action holds the card on the platen for transport from station to station. When the platen extends radially outward at the stacking station it pushes the processed card past the retaining shoulders of the stacking magazine. The platen then terminates its suction action to release the card before the platen retracts from the stacking magazine.

Another problem is to insure accurate positioning of each card with special reference to the positioning of the card at the writing station. Accuracy of high degree is mandatory at the writing station for correct location of the data symbols on the card, precision in this respect being necessary to avoid errors in subsequent automatic reading of data on the cards.

Here again, a number of features work together. One feature is the provision of accurate radial guide slots to guide the platen in its radially outward movements. Another feature is an arrangement for overdriving the platen radially outward in a yielding manner to make sure that the platen seats snugly in the outer ends of the guide slots. A further feature is the provision of an accurate centering cage to center the cards at the writing station. A still further and important feature is the concept of placing the writing station at the bottom of the orbit and the further concept of interrupting the suction action of the platen in a timely manner to free each card as it approaches the centering cage. The released card gravitates downward through a slight, but important distance with full freedom for accurate guidance by the cage and then the platen completes its radially outward advance to clamp the accurately positioned card immovably in the cage for the duration of the writing operation.

The problem of achieving "push-button" control for operation of both the card handling mechanism and the writing mechanism by the keyboard involves a number of cooperating concepts. One concept is to use a solenoid-actuated clutch to actuate the drive shaft through the successive stages of a complete card-handling cycle. Another concept is to drive the transducing means in opposition to a spring in a step by step manner across a card at the writing station, a stepping mechanism being used that comprises a toothed rack, an actuating pawl, and a holding pawl. The actuating pawl is reciprocated by a cam operated by a second clutch that is controlled by a second solenoid and the holding pawl is adapted to be retracted by a third solenoid which may be termed the release solenoid.

Suitable circuits appropriately controlled by the keyboard provide for energizing the first solenoid just long enough to carry out a complete card handling cycle to replace a processed card with a new card at the writing station. The circuitry further provides for energizing the second solenoid for step by step advance of the transducer means and provides for energizing the release solenoid to cause the spring to return the transducer means to its starting position.

Pressing a "feed" key energizes the first solenoid to deliver a new card to the writing station. Pressing any one of numerous symbol keys momentarily energizes the transducer means to write a symbol and also momentarily energizes the second solenoid to advance the transducer means one step. Pressing an "error" key momentarily energizes the third solenoid for spring-actuated return of the transducer to its starting position.

Pressing the E.C. key causes a rapid chain of actions. The second solenoid is energized to move the transducer means rapidly step by step to the end of the card. The transducer means is intermittently energized in synchronism to write a clock symbol at each of the rapidly successive steps. When the transducer means reaches the end of the card, the third solenoid is momentarily energized to release the transducer for its spring-actuated return and, finally, the first solenoid is automatically energized long enough to deliver a new card to the writing station.

The features and advantages of the invention may be understood by reference to the following detailed description and the accompanying drawings.

In the drawings, which are to be regarded as merely illustrative:

FIG. 1 is a perspective view of the presently preferred embodiment of the invention;

FIG. 2 is a plan view of the feed magazine and the stacking magazine showing the platen positioned at the feed magazine;

FIG. 3 is a longitudinal sectional view through the feed magazine and the platen taken as indicated by the line 3—3 of FIG. 2;

FIG. 4 is a plan view of a card that is processed by the invention;

FIG. 5 is a diagrammatic view showing the orbit of the platen and indicating the manner in which the platen reciprocates radially outwardly and inwardly at each of the three stations;

FIG. 6 is a front elevation of the card handling mechanism;

FIG. 7 is an elevation of the left end of the card handling mechanism;

FIG. 8 is an elevation of the right end of the card handling mechanism;

FIG. 9 is a rear elevation of the card handling mechanism;

FIG. 10 is an elevational view with parts in section showing the clutch that controls the drive shaft of the card handling mechanism;

FIG. 11 is an end elevation of the stationary guide yoke for the platen;

FIG. 12 is a fragmentary side elevation of one end of the platen together with one of the associated friction assemblies;

FIG. 13 is a fragmentary transverse section taken along the line 13—13 of FIG. 12 showing how a link operatively connects a friction assembly to one end of the platen, the platen being shown in phantom;

FIG. 14 is an exploded perspective view showing the Geneva gearing, one of the friction assemblies, the cam means for operating the friction assemblies, and the yoke for interconnecting the two friction assemblies;

FIG. 15 is an enlarged section taken as indicated by the line 15—15 of FIG. 9 showing the cam operated linkage for extending the platen radially at each of the three stations;

FIG. 21 is a somewhat simplified side elevational view of a second embodiment of a card handling mechanism that may be employed;

FIG. 22 is a transverse section along the line 22—22 of FIG. 21 showing how a control shaft inside a tubular platen shaft is operatively connected to the platen;

FIG. 23 is a transverse section showing a cam that controls the radial movements of the platen at the various stations;

FIG. 24 is a transverse section taken as indicated by the line 24—24 in FIG. 21 to show a yielding drive connection in the mechanism;

FIG. 25 is a transverse section along the line 25—25 of FIG. 21, showing a portion of the vacuum passage means of the platen;

FIG. 26 is a transverse section along the line 26—26 of FIG. 21 showing the differential gearing for actuating the platen shaft and the control shaft inside the platen shaft;

FIG. 27 is a side elevation of the mechanism for controlling the step by step operation of the transducer means for writing data on a card at the writing station;

FIG. 28 is a bottom view of the same mechanism as seen along the line 28—28 of FIG. 27; and FIG. 29 is a wiring diagram of electric circuits that may be employed for control of the card handling mechanism and the writing mechanism by the keyboard of the apparatus.

*General arrangement of the card-handling mechanism*

Figure 16:
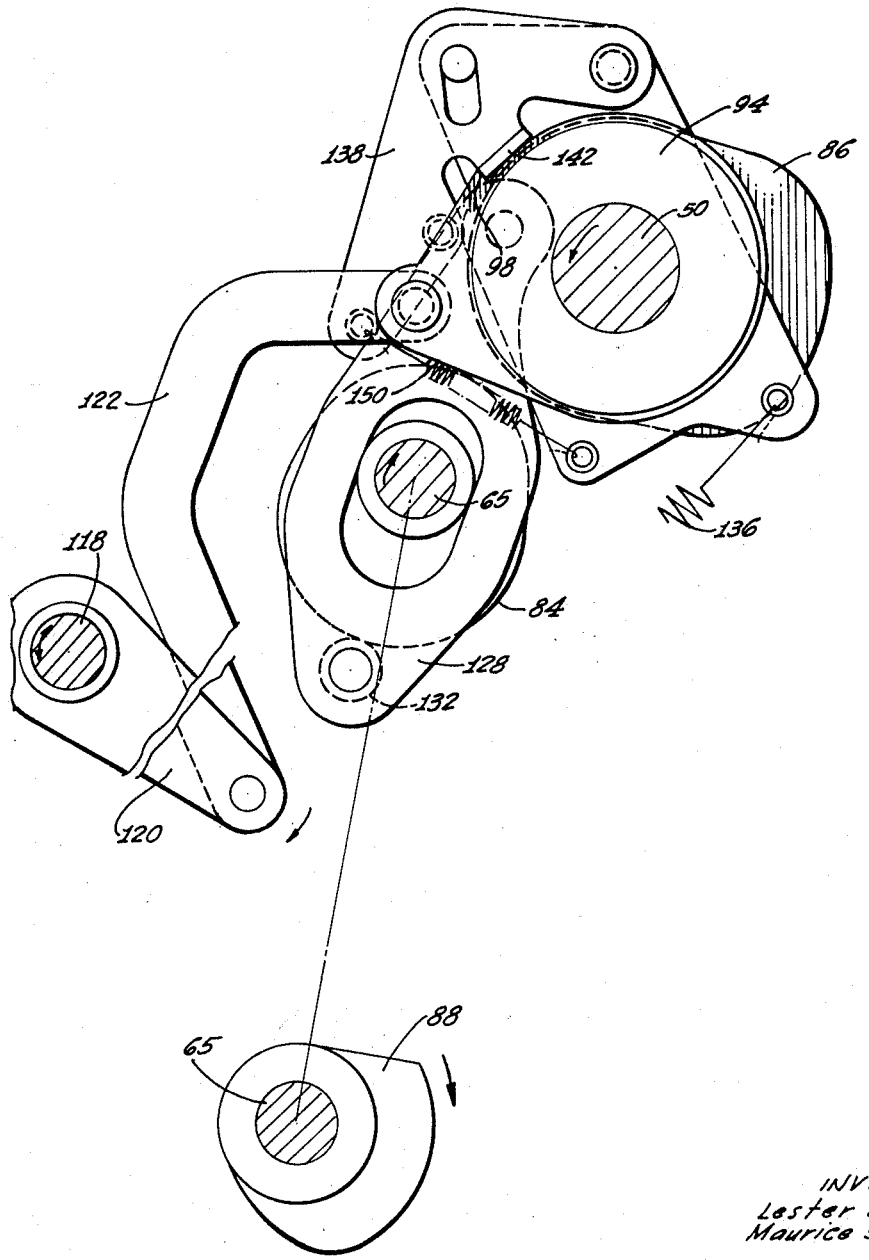
FIG. 16 is a similar view showing the linkage at a second position.

The card-handling mechanism is designed to handle a card of the configuration shown in FIG. 4, which card is generally designated by the letter C, and comprises a flexible 1" x 3" sheet having a "Mylar" base with a layer of ferro-magnetic material for magnetic recording of signals. The card-handling mechanism is constructed to carry out a card-handling cycle of the character shown diagrammatically in FIG. 5.

FIG. 5 shows the path followed by a suitable platen that is slightly larger than the card C and is adapted to pick up and release cards. The platen moves in a circular orbit past a loading station represented by a feed magazine 30, a writing station represented by a magnetic writing head 32 and a stacking station represented by a receiving magazine 34. Starting with the platen at the feeding station the platen moves radially outward from its circular orbit to pick up a card and then retracts radially inward as indicated by the two arrows 35. The platen then moves along its circular orbit to the writing station where the platen moves radially outward as indicated by the arrow 36 to place the card in position for magnetic writing. When the writing operation is completed the platen is retracted as indicated by the arrow 38 and then moves through a second quadrant of its orbit to the stacking station where the platen moves radially outward as indicated by the arrow 40 to deposit the card in the receiving magazine 34. The platen then retracts as indicated by the arrow 42 and moves through two more steps or quadrants of its circular orbit to return to the loading station represented by the feed magazine 30.

As shown in FIG. 1 the card-handling magazine for carrying out the cycle shown in FIG. 5 may be enclosed in a box-like housing 44 which is equipped with the feed magazine 30 and the receiving magazine 34. The magnetic writing at the writing station may be performed by a suitable device 45 having a plurality of finger-operated keys 46. The device 46 may, for example, be a suitably modified "Flexo-Writer" manufactured by Friden, Inc., San Leandro, California.

Figure 19:
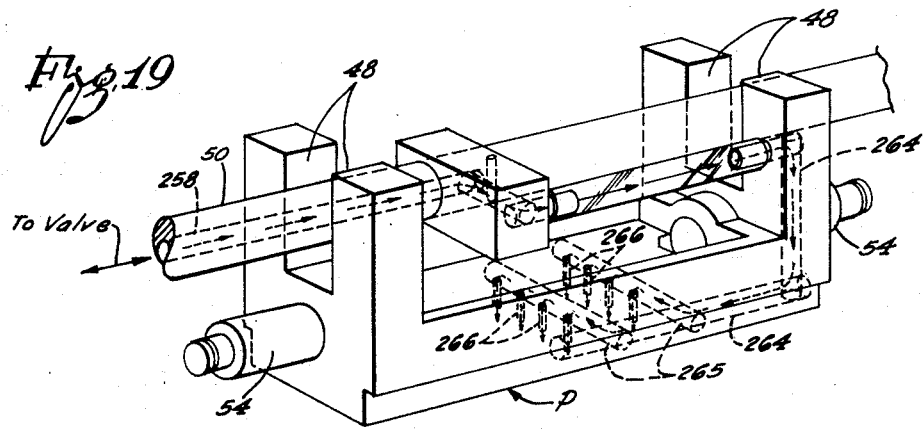
FIG. 19 is a perspective view of the platen showing how it is designed for suction action on the successive cards.

A suitable platen, generally designated by the letter P is shown in FIGS. 2, 3, 11, 12, 14, 19 and 20. The platen P is adapted to pick up and hold a card C by suction. As best shown in FIG. 19, the platen P is formed with two sets of parallel arms 48 at its opposite ends respectively, which straddle a platen shaft 50 on which the platen is mounted for rotation in a circular orbit about the axis of the shaft. As best shown in FIGS. 11 and 12 the platen shaft 50 is formed with a pair of longitudinally spaced guide blocks 52 for cooperation with the two pairs respectively of the parallel arms 48. The guide blocks have parallel faces for sliding contact with the inner surfaces of the parallel arms 48 to permit the platen to move radially inwardly and outwardly relative to the platen shaft 50.

The platen P is further provided with trunnions 54 on its opposite ends (FIGS. 12, 19 and 20) which slidingly engage corresponding radial guide slots 55 (FIGS. 11 and 14) in a pair of guide members 56 that are integral with the platen shaft 50. Thus the trunnions 54 cooperating with the radial guide slots 55 and the parallel platen arms 48 cooperating with the guide blocks 52 insure that the platen P will be guided radially of the axis of the platen shaft in a highly accurate manner.

To further insure accuracy in the positioning of the platen at the three stations in the card-handling cycle, two fixed guide yokes 58 (FIGS. 11 and 14) are positioned adjacent the opposite ends of the platen to cooperate with the trunnions 54 at the three stations. The two guide yokes 58 have radial guide recesses 60 to receive the trunnions 54 at the loading station, radial guide recesses 62 to receive the trunnions at the writing station, and radial guide recesses 64 to receive the two trunnions at the stacking station.

The principal parts of the mechanism for actuating the platen P include: a drive shaft 65 (FIGS. 6, 9 and 14) which rotates 360° for each of the four steps or stages of the handling cycle shown in FIG. 5; a normally disengaged clutch, generally designated 70 (FIGS. 6 and 9) controlled by what may be termed a card-cycling solenoid 72 which when actuated connects the drive shaft 65 with a continuously rotating power-driven shaft 73 actuated by a drive wheel 66 for one complete revolution of the drive shaft; Geneva gearing including a Geneva wheel 74 on the platen shaft 50 to rotate the platen shaft 90° in the course of each revolution of the drive shaft 65; a left-hand platen-actuating link 75 (FIGS. 9 and 14); a right-hand platen-actuating link 76 (FIGS. 9, 13 and 14), the two links being connected to the two guide trunnions 54 respectively of the platen P to control the radial extension and radial retraction of the platen relative to the platen shaft 50, a left hand friction assembly, generally designated 78 (FIGS. 9 and 14) on the platen shaft 50 to control the left-hand platen-actuating link 75; a right-hand friction assembly, generally designated by numeral 80 (FIGS. 9, 12 and 13) on the platen shaft 50 adjacent the right hand side of the platen P; a yoke 82 (FIGS. 6, 14, 15 and 16) to interconnect and synchonize the two friction assemblies 78 and 80; a mechanism including a platen-extending cam 84 (FIGS. 14 and 16) on the drive shaft 65 to actuate the two friction assemblies 78 and 80, respectively, to extend the platen P radially outward at each of the three stations; a mech- anism including a pawl-lifting cam 86 (FIGS. 9 and 14) on the platen shaft 50 to prevent radial extension of the platen P at the end of the third step or stage in the previously described operating cycle; a mechanism including a platen-retraction cam 88 (FIGS. 10 and 14) on the drive shaft 65 for operating the two friction assemblies 78 and 80 by means of the yoke 82 for radial retraction of the platen P at the three stations of the cycle; and a mechanism including a cam 90 (FIG. 8) to control the suction action of the platen P on the successive cards C.

As best shown in FIGS. 9 and 14, the left hand platen-actuating assembly 78 includes: a thick disk segment 91 with a hub 92 rotatably mounted on the platen shaft 50, a pair of metal disks 94 and corresponding felt washers 95, the metal disks being keyed to the hub 92; and a rocker disk 96 that is freely rotatable on the hub 92 and is sandwiched between the two felt washers 95 for frictionally actuating the two metal disks 94 thereby to actuate the thick disk segment 91, the rocker disk 96 having a peripheral tooth 98 by means of which it is actuated in one rotary direction, the thick disk segment 91 housing a plurality of coil spring 100 to create the frictional pressure against the rocker disk 96, the thick disk segment 91 being connected by a pivot pin 102 to the corresponding left hand platen-actuating link 75.

The right hand friction assembly shown in FIGS. 9, 12 and 13 includes: a thick right hand disk segment 106 with an integral hub 107; a pair of metal disks 108 keyed to the hub; a corresponding pair of felt washers 110; and a right hand rocker disk 112 sandwiched between the two felt washers for frictionally actuating the pair of metal disks 108 thereby to actuate the thick right hand disk segment 106, the disk segment 106 having the usual coil spring 114 to create the frictional pressure and being connected by a pivot 116 to the right hand platen-actuating link 76.

The yoke 82 shown in FIGS. 6, 14, 15 and 16 to interconnect and synchronize the two friction assemblies 78 and 80 includes: a rocker shaft 118; a left hand rocker arm 120 keyed to the rocker shaft; an angular link 122 connecting the left hand rocker arm to the left hand rocker disk 96; a right hand rocker arm 124 keyed to the rocker shaft; and an angular link 125 connecting the right hand rocker arm 124 to the right hand rocker disk 112.

As shown in FIGS. 14–17, the mechanism that includes the platen-extending cam 84 on the drive shaft 65 to extend the platen P radially outward at each of the three stations includes: a link plate 128 formed with a slot 130 to straddle the drive shaft 65, the link plate having a rotary follower 132 riding on the platen-extension cam 84 for actuation of the left hand platen-actuating link 75; a rocker plate 134 rotatably mounted on the platen shaft 50, the rocker plate being connected to the link plate 128 by a pivot 135; a coil spring 136 connected to the rocker plate 134 to urge the rocker plate in a rotary direction for holding the follower 132 on the link plate 128 against the platen-extending cam 84; a pawl plate 138 rotatably mounted on the rocker plate 134 by a pivot 140, the pawl plate being formed with a pawl tooth 142 for periodic engagement with the previously mentioned tooth 98 of the left hand rocker disk 96, the pawl plate having a guide slot 146 in sliding engagement with a guide pin 148 on the rocker plate 134; and a coil spring 150 interconnecting the rocker plate 134 and the pawl plate 138 to urge the pawl plate in a rotary direction to urge the pawl tooth 142 towards the left hand rocker disk 96.

As best shown in FIG. 14, the mechanism for cooperating with the pawl-lifting cam 86 on the platen shaft 50 to prevent radial extension of the platen P at the end of the third step or stage in the previously described operating cycle comprises a follower in the form of a pin 152 extending laterally from the pawl plate 138. The pawl-lifting cam 86 cooperates with the pin 152 periodically to lift the pawl tooth 142 of the pawl plate 138 to prevent engagement of the tooth 142 with the tooth 98 of the left hand rocker disk 96.

The mechanism shown in FIG. 14 for cooperation with the platen-retracting cam 88 on the drive shaft 65 for operating the two friction assemblies 78 and 80 for radial contraction of the platen P at the three stations of the cycle comprises a rotary follower 156 riding on the cam 88, the follower being mounted on an arm 158 that is carried by the previously mentioned angular link 125.

The mechanism for cooperating with the cam 90 to control the suction action of the platen P on the successive cards C includes: a valve 159 (FIGS. 6, 8 and 9); a solenoid 160 to control the valve; a switch 162 (FIG. 8) to control the solenoid, the switch having an operating plunger 164 equipped with a rotary follower 165, the rotary follower riding on the cam 90 and the cam having two dwells 168 to cooperate with the follower 165 for causing suction action on the part of the platen P; a relatively large gear 170 carrying the cam 90, the gear being mounted on a spindle 172; and a pinion 174 that is keyed to the drive shaft 65 in mesh with the gear 170 to cause one revolution of the cam 90 for each full revolution of the drive shaft 65 whereby the cam is synchronized with the four-stage operating cycle of the platen.

*The mode of operation of the card handling mechanism*

Figure 18:
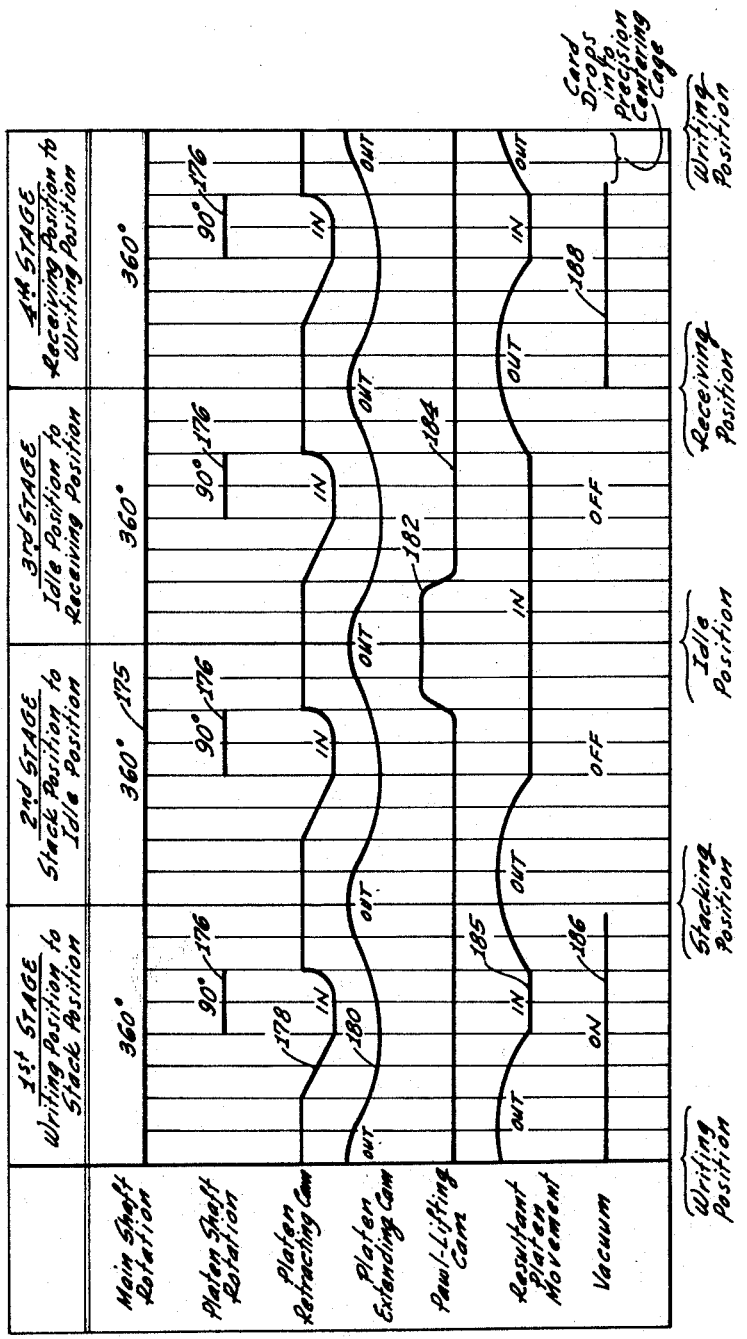
FIG. 18 is a diagram showing the sequence of cam actions in the operating cycle of the card handling mechanism.

The time relationships involved in the operation of the Geneva wheel 74 and the various cams for controlling the platen P are indicated diagrammatically in FIG. 18 where the card-handling cycle is shown as beginning with the platen extended at the writing station which may be regarded as the "home" station. Each of the four stages shown in FIG. 18 is carried out by energizing the clutch solenoid 72 to cause one complete revolution of the drive shaft 65, the four successive rotations of the drive shafts being indicated by the line 175 in FIG. 18. The four short lines 176 indicate the timing of the rotation of the platen shaft 50 relative to the rotation of the drive shaft 65, this timing being accomplished by the Geneva gearing. The operation of the platen-retracting cam 88 is indicated by the curve 178; the operation of the platen-extending cam 84 is indicated by the curve 180; and the timing of the pawl-lifting cam 86 is indicated by the offset 182 in the line 184. The resulting radial movement of the platen P is indicated by the line 185. The suction action by the platen that is controlled by the cam 90 is indicated by the two spaced lines 186 and 188.

The drive wheel 66 is continuously rotated. Whenever the solenoid 72 is actuated to operate the clutch 70 the drive wheel 66 rotates the drive shaft 65 for one complete revolution. In the course of this revolution a pin 190 on a disk 192 enters one of the four radial slots of the Geneva wheel 74 to cause a quarter of a revolution by the platen shaft 50, the timing of the platen shaft rotation relative to the rotation of the main shaft 65 being indicated by the lines 176 and 175 in FIG. 18. When the Geneva wheel 74 is not being operated by a pin 190, the Geneva wheel is held stationary in a well-known manner by engagement of a concave portion of the Geneva wheel by a hub 194 on the disk. As indicated in FIG. 14, the hub 194 has a recess or concave portion 194a to permit 90° rotation of the Geneva wheel.

At the beginning of each revolution of the main shaft 65, the platen is extended and the parts of the linkage associated with the platen-extending cam 84 are positioned as shown in FIG. 16. The platen-extending cam 84 soon retracts relative to the follower 132 on the link plate 128 and permits corresponding spring-actuated retraction of the pawl plate 138 to the position shown in FIG. 15. Just before the 90° rotation of the platen shaft occurs, the platen-retracting cam 88 lifts the follower 156 and thereby lifts the yoke 82. The lifting of the yoke 82 causes the yoke acting through the angular links 122 and 125 to rotate the left-hand rocker disk 96 and the right-hand rocker disk 112 to cause retraction of the platen as indicated by the line 185 in FIG. 18, the retraction occurring just before the revolution of the cam shaft that is indicated by line 176 in FIG. 18. The rotation of the left-hand rocker disk 96 and of the right-hand rocker disk 112 acting through the corresponding felt washers causes rotation of the two thick disk segments 91 and 106 respectively. The two disk segments 91 and 106 acting through the two corresponding links 75 and 76 retract the platen by force applied to the two platen trunnions 54.

After the 90° rotation of the platen shaft 50 occurs the platen-extending cam 84 acting on the follower 132 shifts the link plate 128 downward to cause corresponding rotation of the rocker plate 134. The rocker plate 134 advances the pawl plate 138 to move the pawl tooth 142 against the tooth 98 on the left hand rocker disk 96 as shown in FIG. 16. The consequent rotation of the left-hand rocker disk 96 acts through the yoke 82 to cause similar clockwise rotation of the right-hand rocker disk 112. Thus the two rocker disks of the two friction assemblies acting in unison cause rotation of the thick disk segments 91, 106 to cause the platen to shift radially outward at the stacking or receiving magazine 34.

As indicated by the line 186 in FIG. 18, the suction apertures of the platen are active during the first stage of the cycle to cause the card that has been processed at the writing station to adhere to the platen until the platen reaches the stacking station and moves outward at the stacking magazine 34. The suction action then is cut off to permit the platen to be retracted from the stacking station without bringing with it the newly delivered card. At the stacking magazine the outwardly extending platen pushes the card past barriers or retaining shoulders 195 at the opposite ends of the card to cause the card to snap into its stacked position.

Figure 17:
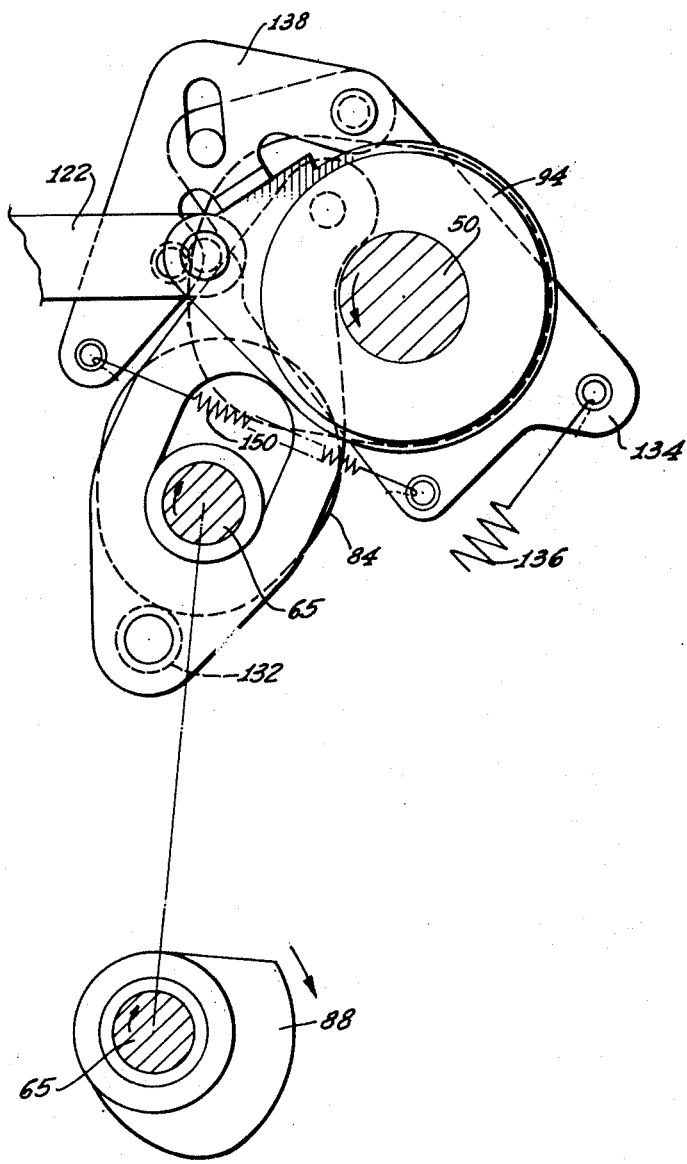
FIG. 17 is a similar view showing the linkage at a third position.

When the clutch solenoid 72 is again energized for another revolution of the main shaft 65 for orbital movement of the platen from the stacking magazine 34 to the idle position of the platen at the top of its orbit, the platen-extending cam 84 and the platen retracting cam 88 operate in the same manner as in the first stage of the cycle but at this time the pawl-lifting cam 86 on the platen shaft 50 blocks the downward movement of the pin 152 on the pawl plate 138 to keep the pawl tooth 142 elevated out of engagement with the tooth 98 of the rocker disk 96 as shown in FIG. 17. Consequently the platen does not extend outward at the idle position of the platen. The cam 86 and the pin 152 may be omitted to permit the platen to be extended at the idling station but if so it would be necessary to increase the height of the housing 44 to provide additional clearance.

In the third stage of the operating cycle the platen shifts along its orbit to the receiving station where the platen shifts radially outward to pick up a blank card from the feed magazine 30. In the fourth stage of the cycle which begins with the platen extended at the feed magazine 30 the suction apertures of the platen are activated as indicated by the line 188 in FIG. 18 to cause the blank card at the front of the feed stack to cling to the platen. The cards in the feed magazine 30 are retained by repair of short barriers or retaining shoulders 202 which engage the opposite end edges of the front card. With the suction effect causing the front card to adhere to the platen retraction of the platen pulls the front card past the two retaining shoulders 202 with a snap action. The suction ceases however, when the platen reaches the writing station to permit the card to drop from the platen onto a precision centering cage on the writing station.

As indicated in FIG. 14 the centering cage comprises parts carried by the two guide yokes 58 and includes a pair of ears 196 to engage the sides of the card at each end of the card, one of the pairs of ears being shown in FIG. 14. The centering cage further includes a pair of shoulders 198 to engage each end of the card, one of the pair of shoulders being shown in FIG. 14. The bottom of the centering cage on which the cards rest is provided by two pairs of longitudinal fingers 200 at the opposite ends respectively of the cage, one of the pairs of fingers being shown in FIG. 14.

The card is momentarily free to gravitate to a position that is accurately predetermined by the centering cage. Immediately thereafter the platen comes to rest in a position to firmly clamp the card in place for the writing operation.

When the platen shifts outward at the receiving station the trunnions 54 at the opposite ends of the platen enter the radial guide recesses 60 of the guide yoke 58. In like manner the platen trunnions 54 enter the radial guide recesses 62 at the writing station and the radial guide recesses 64 at the stacking station. Thus the radial guide recesses insure accurate poistioning of the platen at each of the three stations. In this regard a feature of the invention is that the magnitude of the oscillation of the left-hand rocker disk 96 and the right-hand rocker disk 112 of the two friction assemblies is greater than necessary for full extension of the platen at the three stations. Consequently the platen actuating links 75 and 76 force the trunnions 54 to limit positions in the three sets of radial guide recesses 60, 62 and 64 whereupon the rotation of the two thick disk segments 91 and 106 is arrested while the rocker disks 96 and 112 continue to rotate. The provision for excess rotation of the two rocker disks 96 and 112 with yielding friction driving action insures that the platen will be extended to its limit position at each of the three stations.

*Structural details of the card-handling mechanism*

The working parts of the card-handling mechanism are carried by a suitable support structure that is enclosed by the previously mentioned box-like housing 44. The support structure comprises a frame mounted on a base plate 204. The frame includes a vertical H-shaped flanged plate 205 on the front side of the mechanism, a vertical flanged plate 206 on the rear side of the mechanism, a transverse end plate 208 at one end of the mechanism, a transverse end plate 210 at the other end of the mechanism, an intermediate transverse plate 212, and various tie rods interconnecting the three transverse plates.

The clutch 70 is of a well-known construction which includes a concealed coil spring (not shown) to frictionally grip the drive shaft 65. As best shown in FIG. 10, the clutch includes an outer rotary cylinder 215 formed with a peripheral tooth 216 for cooperation with the previously mentioned control solenoid 72 and formed with a second oppositely directed holding tooth 218 for cooperation with a holding pawl 220. The holding pawl 220 is urged to its effective position by a suitable spring 222 to prevent reverse rotation of the cylinder. The solenoid 72 has an armature 224 with a latching tooth 225, the armature being biased by a spring 226 to position the latching tooth for engagement with the tooth 216 to keep the clutch in its normal release position. When the solenoid 72 is momentarily energized to lift the latching tooth 225 in opposition to the spring 226, the rotary cylinder 215 makes a complete revolution ending with the tooth 216 again in engagement with the latching tooth 225.

The construction of the feed magazine 30 and the receiving or stacking magazine 34 are substantially identical and may be understood from a description of the stacking magazine. Referring to FIGS. 1, 2 and 3, the stacking magazine comprises an open ended tray 230 having side walls 232 formed with outwardly extending side flanges 234. Slidably mounted inside the tray 230 is a hollow metal block 235 which is continuously urged forward by a ribbon spring 236, the block yieldingly retreating as new cards C are added to the stack in the tray. Mounted in the bottom of the tray 230 along each of its longitudinal sides is a pair of runners 238 which slidingly support both the stacked cards and the follower block. The runners 238 may be made of Teflon to minimize frictional resistance to sliding movement.

The ribbon spring 236 is anchored at the front end of the tray and extends under the stacked cards and under the block 235, the spring being wound on a rotatable spool 240 inside the block. The bottom wall of the tray is formed with a longitudinal guide slot 242 and a longitudinal guide rib 244 of the block 235 extends into the guide slot to maintain longitudinal alignment of the block. The forward end of the black 235 is formed with a recess 245 to provide finger space for access to the stacked cards. In the construction shown, an angular handle 246 is attached to the follower block at the recess 245, the handle extending rearward above the block and being flanged to form a finger piece 248. The forward end of the tray 230 is provided with a bracket 250 that is anchored by suitable screws 252, the bracket providing the previously mentioned retaining shoulders 195 that retain the stack of cards in the magazine.

With reference to the vacuum system, the previously mentioned valve 159 has its exhaust port connected by a tube 254 (FIG. 8) to a suitable vacuum pump and has a vent port 255 (FIG. 6) to the atmosphere. A slidable valve member 256 actuated by the solenoid 160 has a normal position, i.e. a position when the solenoid is de-energized, at which the valve member cuts off the exhaust tube 254 and opens the vent port 255 to prevent the creation of a vacuum at the platen. When the solenoid 160 is energized, the valve member 256 shifts to an alternate position at which it closes the vent port 255 and opens the exhaust port to the tube 254 for creating a vacuum at the platen.

Figure 20:
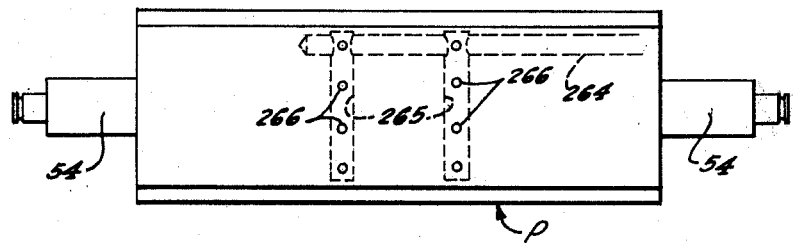
FIG. 20 is a face view of the platen showing the suction ports.

As indicated in FIG. 19 the passage system for connecting the valve 256 with the platen includes an axial passage 258 in the platen shaft 270 which is continued radially outward through a block 260 that is mounted radially on the shaft. A flexible plastic tube 262 connects this passage with a passage 264 in one of the four parallel arms 48 of the platen. As indicated in FIGS. 19 and 20, the passage 264 extends along the platen and has two parallel branch passages 265 with spaced suction ports or apertures 266 to act on the successive cards.

*The alternate embodiment of the card-handling mechanism shown in FIGS. 21–26*

In this alternate embodiment, a platen P' is mounted on a platen shaft 270 in the same general manner as heretofore described. A clutch-controlled drive shaft 272 correspondng to the drive shaft 65 of the first embodiment actuates the platen shaft 270 by means of the usual Geneva wheel 274, the Geneva wheel being operated through 90° by a pin 275 on a disk 276 carried by the drive shaft.

The platen shaft 270 is tubular to house a coaxial control shaft 278. Adjacent each end of the platen P' a radial arm 280 extends from the control shaft 278 through corresponding slots 282 in the tubular platen shaft 270. These radial arms 280 are operatively connected to corresponding trunnions 284 of the platen P' by corresponding curved links 285. The curved links 285 correspond to the platen actuating links 75 and 76 of the first embodiment of the invention.

To cause the control shaft 278 to rotate 90° synchronously with the platen shaft 270 the platen shaft is connected to the control shaft by a gear train that includes a differential gearing generally designated 286 shown in FIGS. 21 and 26. The differential gearing 286 comprises a beveled input gear 288, a peripheral input gear 290, a beveled output gear 292 and a pair of beveled planetary gears 294 which mesh with both beveled gears 288 and 292, the two planetary gears being journalled on the inside of the peripheral input gear 290. The gear train that operatively connects the platen shaft 270 to the control shaft 278 comprises: a drive gear 295 on the platen shaft 270; a gear 296 that is in mesh with the gear 295 and is on one end of a counter shaft 298; the beveled input gear 288 on the other end of the counter shaft 298; the two planetary gears 294; the beveled output gear 292; a gear 300 that is unitary with the output gear 292; a gear 302 on the platen shaft 270; and a gear 304 on a spindle 305, the gear 304 being in mesh with both the gear 300 and the gear 302.

Periodic oscillation of the control shaft 278 independently of the platen shaft 270 for extension and retraction of the platen P' when the platen shaft is stationary is accomplished by means including a rocker shaft 306 which is connected by a gear 308 to the peripheral input gear 290 of the differential gearing 286. The rocker shaft 306 has a yielding operative connection with a suitable shaft 310 that carries a gear 312. Referring to FIGS. 21 and 24 the yielding connection includes an angular arm 314 on the stub shaft 310. A thick disk 315 on the rocker shaft 306 is formed with a concentric arcuate slot 316 which houses a compression spring 318. The angular arm 314 extends into the arcuate slot 316 to transmit rotation to the disk 315 by compression of the spring 318.

The gear 312 on the stub shaft 310 meshes with a gear 320 on a spindle 322. An arm 324 that is unitary with the gear 320 carries a follower 325 that is urged against the periphery of a cam 326 by a suitable spring 328. Suitable gearing is provided to rotate the cam 326 through one complete revolution for each four revolutions of the drive shaft 272. For this purpose a small gear 330 on the drive shaft 272 meshes with a four times larger gear 332 on a counter shaft 334, which counter shaft carries the cam 326. As shown in FIG. 23 the cam 326 is formed with three lobes 335 which are spaced 90° apart and which correspond to the receiving station, printing station, and stacking station respectively of the orbit of the platen P'.

The counter shaft 334 carries a second cam 336 which has the same function as the cam 90 of the first embodiment of the invention. Thus the cam 336 contacts a follower 338 on a spring-biased plunger 340 of a switch 342, the switch controlling the previously mentioned solenoid 160 for operating a vacuum valve 159. As shown in FIGS. 21 and 25 the vacuum passages for controlling the suction action of the platen P' include an axial passage 344 in the control shaft 278 and a flexible plastic tube 345 that connects the axial passage 344 with the interior of the platen P'.

It is apparent that each time the Geneva wheel 274 is rotated 90° for rotation of the platen shaft 270, the differential gearing 286 causes the control shaft 278 to be rotated 90° synchronously with the platen shaft. With the platen shaft 270 stationary and the platen P' positioned opposite the receiving station, the printing station or the stacking station, a lobe 335 of the cam 336 cooperating with the follower 325 causes oscillation of the rocker shaft 306 to cause corresponding oscillation of the control shaft 278 for extending and retracting the platen P'. The yielding opertaing connection provided by the compression spring 318 insures that the platen is forced to a limit position at each of these three stations. As heretofore explained, the limit positions are determined by radial guide recesses in a guide yoke.

*The writing carriage*

Any suitable means may be provided for applying data to the successive cards C at the writing station. In the present example, a suitable magnetic writing head (not shown) is provided for magnetic recording in binary code. Whatever writing means is employed must be shifted intermittently by a stepping mechanism along the length of the platen at the writing station. As indicated in phantom in FIG. 27 a carriage 360 for the writing means may be mounted on longitudinal guide rod means 362 to reciprocate across the writing station in close spacing to the face of the platen.

A suitable tension spring 364 continuously urges the carriage rightward in FIG. 27 to a starting position for a printing operation. The carriage is advanced step by step from the starting position by means of an actuating pawl 365 which engages successive teeth 366 of a longitudinal rack 368 that is mounted on the carriage. Each time the carriage is moved one step by the actuating pawl 365, a holding pawl 370 engages one of the teeth to prevent retraction of the carriage.

In the present embodiment of the invention the actuating pawl 365 is carried by a pivot 372 on a rocker arm 374. The rocker arm 374 is mounted on an upper pivot 375 and is controlled by a follower 376 that extends from the rocker arm into a circumferential cam groove 378 of a barrel cam 380. To keep the follower 376 in the cam groove, the lower end of the rocker arm 374 is formed with a pair of offset guide wings 382. The two guide wings 382 are in sliding contact with a fixed guide bar 384 that is parallel with the axis of the barrel cam 380.

The barrel cam 380 is fixedly mounted on an actuating shaft 385 which is suitable arranged to make one complete revolution in response to an electrical pulse. For this purpose the actuating shaft 385 is connected by a normally disengaged clutch 386 to a pulley 388 and the pulley 388 is connected by a belt 390 to a larger drive pulley 392 (FIG. 6), the larger pulley being on a previously mentioned power driven shaft 73.

The clutch 386 is of the same construction as the previously mentioned clutch 70 and functions in the same manner. Referring to FIGS. 6 and 10, the clutch 386 includes an outer rotary cylinder 395 formed with a peripheral tooth (not shown) for normal engagement by a pawl 396 which is the armature of a solenoid 398 which may be termed the barrel cam clutch solenoid. The outer rotary cylinder 395 is formed with a second oppositely directed holding tooth (not shown) for cooperation with a holding pawl 400.

In the previously described manner, the pawl 396 is biased to its engagement position by a suitable spring 402 and the holding pawl 400 is biased to its effective position by a spring 404. When the solenoid 398 is momentarily energized by a pulse of current, the pawl 396 is momentarily retracted to permit the rotary cylinder 395 to make a complete revolution thereby causing the barrel cam 380 to make a complete revolution.

Each complete revolution of the barrel cam 380 causes the actuating pawl 365 to move through one cycle of advance and retraction. As shown in FIG. 30, the actuating pawl 365 is held by a spring 405 against a fixed stud 406. When the actuating pawl 365 is in its retracted position the stud 406 holds the pawl out of engagement with the rack 368. When the actuating pawl 365 is advanced by the barrel cam 380 the actuating pawl slides past the fixed stud 406 into engagement with a tooth 366 of the rack. The parts are so dimensioned that each advance of the actuating pawl 365 advances the rack 368 by one tooth, the holding pawl 370 being cammed out of engagement with one tooth to snap into engagement with the next successive tooth. Thus each pulse of current delivered to the barrel cam clutch solenoid 398 advances the carriage 360 by one incerment to advance the card on the platen a corresponding increment relative to the writing head.

The holding pawl 370 is mounted on a fixed pivot 408 to swing into and out of engagement with the rack teeth 366. A suitable spring 410 is connected to a lower arm 412 of the holding pawl 370 to bias the holding pawl towards the rack teeth 366. The arm 412 has a lateral extension 414 at its lower end (FIG. 28) which is connected to an armature 415 of a release solenoid 416. Thus when the carriage 360 is held at an advanced position by engagement of the holding pawl 370 with a tooth 366 of the rack 368, the actuating pawl 365 being retracted, energization of the release solenoid 416 retracts the holding pawl to release the carriage to permit the spring 364 to return the carriage to its starting position.

A suitable latch 420 is provided to latch the holding pawl 370 at its retracted position whenever the holding pawl is retracted by the release solenoid 416. The latch 420 is mounted on a pivot 422 and is urged towards its latching position by a suitable spring 424. Normally the latch 420 simply rests on the holding pawl 370 in the position shown in FIG. 30 as the holding pawl oscillates for engaging the successive rack teeth 366 as the rack is progressively advanced by the actuating pawl 365. When the holding pawl 370 is retracted to greater extent by the release solenoid 416 the latch 420 drops into engagement with a latching shoulder 425. The engagement of the latch 420 with the latching shoulder 425 prevents the holding pawl 370 from returning to its effective position when the solenoid is de-energized. Thus only momentary energization of the solenoid 416 is required to permit the spring 364 to return the carriage 360 to its starting position.

For the purpose of unlatching the holding pawl 370, the latch 420 is formed with a cam shoulder 426 and the rack is provided with a release shoulder 428 to cooperate with the cam shoulder. As the carriage approaches its starting position in its spring-actuated return movement, the release shoulder 428 of the rack 368 strikes the cam shoulder 426 of the latch 420 to swing the latch free from the latching shoulder 425. The spring 410 thereupon springs the holding pawl 370 to its effective position to keep the latch 420 out of engagement with the latching shoulder 425.

From the above description it is apparent that it is necessary merely to deliver a pulse of current to the control solenoid 398 to cause the actuating pawl 365 to advance the carriage one step in the procedure of writing data on a card at the writing station. At the end of the writing operation it is merely necessary to deliver a pulse of current to the release solenoid 416 to cause the carriage to return to its starting position in preparation for writing data on the next successive card at the writing station.

*Control system*

In a preferred practice of the invention it is contemplated that the operator of the code writing device will control both the operation of the card handling mechanism and the operation of the writing head carriage 360 by depressing suitable keys among the keys 46 of the keyboard. Depressing a "feed" key causes the card handling mechanism to carry out a complete cycle automatically to move the written card from the writing station to the stacking magazine 34 and to pick up a new card from the feed magazine 30 and carry the new card to the writing station for the next operation of data recording.

Depressing an appropriate key causes a corresponding symbol to be written in code on the card at the writing station and shifts the carriage 360 one increment in preparation for writing the next symbol. Depressing an "error" key returns the writing head carriage 360 to its starting position for rewriting data. Depressing an "end of code" key (E.C. key) at the end of a recording operation causes the writing head carriage 360 to be stepped rapidly to shift the writing head to the end of the card. The writing head writes a symbol at each step to indicate that the code is ended, thus avoiding a blank portion on the card.

The character of the circuitry required for carrying out these different functions may be understood by reference to the wiring diagram in FIG. 29 which will now be described.

The card-cycling clutch solenoid 72 is controlled by a contactor 430 of a relay 432, the relay having a second contactor 434 to complete a holding circuit. The coil of the relay 432 is connected in parallel to a normally open contactor 435 of a relay 436 and a second normally open contactor 438 of a relay 440. The holding circuit of the relay 432 includes a limit switch 442 controlled by the platen P, the switch being opened by extension of the platen when the platen is at the writing station. The holding circuit of the relay 432 also includes a normally open contactor 445 of a relay 446, the contactor being in parallel with the limit switch 442.

The relay 446 has a second contactor 448 in a holding circuit which includes a normally closed switch 450. The normally closed switch 450 is controlled by a lobe 451 on a cam 452 on the platen shaft. The coil of the relay 446 is connected in parallel with a normally open contactor 453 of a relay 454 and a normally open contactor 455 of a relay 456. A "feed" switch 458 that is operated by the "feed" key on the keyboard has a normal position at an energized contact 462 for charging a capacitor 460. Depressing the "feed" key moves the switch 458 to a second contact 464 to cause the capacitor 460 to discharge through the coils of the two relays 436 and 454.

When the writing head carriage 360 reaches its limit position at the end of a recording operation, the carriage operates a limit switch 465. The limit switch 465 has a normal position connecting an energized contact 466 to a capacitor 467 for charging the capacitor. When the limit switch 465 is operated by the carriage it connects the capacitor to a second contact 468. The contact 468 is in series with the coils of the two previously mentioned relays 454 and 456 and is also in series with the coil of a relay 470.

A "writing" switch 472 which is operated whenever any of the symbol keys is depressed normally connects a grounded capacitor 474 to an energized contact 475. When the writing switch 472 is operated it connects the charged capacitor to a contact 476. The contact 476 is connected to writing circuitry that includes a writing head and is indicated by the block 478. The contact 476 is also connected through a rectifier 480 to the previously mentioned clutch solenoid 386 that controls the barrel cam 380.

An "EC" switch 482 has a normally position at an energized contact 484 to charge a capacitor 485. When the "EC" key is depressed the switch 482 is moved to a second contact 486 to energize a relay 488 having a normally open contactor 490. The contactor 490 controls the coil of a relay 492 that has two normally open contactors 494 and 495. The contactor 494 closes a circuit through the barrel cam clutch solenoid 386 and the second contactor 495 closes a holding circuit for the relay 492 which holding circuit includes a normally closed contactor 496 of the previously mentioned relay 470. On the grounded side of the normally closed contactor 496, the holding circuit of the relay 492 is connected with the writing circuitry 472 through a switch 498 that is controlled by a lobe 500 of a cam 502 on the previously mentioned barrel cam shaft 385. The relay 470 has a second contactor 504 which normally connects a capacitor 505 to an energized contact 506. When the relay 470 is energized the contactor 504 moves to a second contact 508 which is in series with the previously mentioned carriage release solenoid 416.

An "error" switch 510 which is operated by the "error" key on the keyboard normally connects a grounded capacitor 512 to an energized contact 514 for charging the capacitor. When the "error" key is depressed the "error" switch 510 moves to a second contact 515 to place the charged capacitor in series with the carriage release solenoid 416.

*Operation of the control system*

When the "feed" switch 458 is operated by the "feed" key on the keyboard to replace a card at the writing station, the "feed" switch discharges the capacitor 460 through the coils of the two relays 436 and 454. The relay 436 energizes the relay 432 thereby energizing the card cycling clutch solenoid 72 and closing the contactor 434 of the holding circuit. At the same time the energization of the relay 454 by the "feed" switch closes the contactor 453 to energize the relay 446. Energization of the relay 446 closes the contactor 445 to complete the holding circuit of the relay 432 and at the same time closes the contactor 448 to complete a holding circuit for the relay 446, the latter holding circuit including the normally closed switch 450. The card-cycling clutch solenoid 72 remains energized to cause the card-handling platen to move through its four stages begining at the writing station.

Initial rotation of the drive shaft causes the platen P to retract at the writing station with consequent closing of the limit switch 442. Just before the platen P completes its orbit to return to the writing station, the lobe 451 on the cam 452 momentarily opens the normally closed switch 450 to break the holding circuit for the relay 446. The consequent de-energization of the relay 446 opens the contactor 445 of the holding circuit of the relay 432 but the holding circuit for the relay 432 remains closed through the limit switch 442. When the platen is extended at the writing station it opens the limit switch 442 to break the holding circuit for the relay 432 thereby opening the circuit through the card-cycling clutch solenoid 72.

Whenever the carriage reaches the end of its run to place the writing head at the end of a card at the writing station it mechanically operates the limit switch 465 for momentary energization of the three relays 440, 456 and 470. The relay 440 momentarily closes the contact 438 to energize the relay 432. Energization of the relay 432 closes the circuit through the card-cycling clutch solenoid 72. At the same time the relay 456 energizes the relay 446 to close the contactor 445 to complete a holding circuit for the relay 432. As previously described the card-cycling clutch solenoid remains energized long enough for completion of a card handling cycle, the clutch solenoid being de-energized at the end of the cycle by the opening of the limit switch 442 by the platen P.

Each time a key is pressed to record a symbol on a card at the writing station, the writing switch 472 discharges the capacitor 474 through the writing circuitry to record a symbol on the card and at the same time the capacitor 474 momentarily energizes the barrel cam clutch solenoid 386 to cause the writing head carriage 360 to advance one increment.

If an error occurs in the course of recording symbols on a card at the writing station, the operator depresses an "error" key for momentary operation of the "error" switch 510. The error switch 510 discharges the capacitor 512 through the carriage release solenoid 416 to cause the holding pawl 370 to be retracted and retained by the latch 420. The writing head carriage 360 is then returned to its starting position by the spring 364 with consequent unlatching of the holding pawl 370.

When the "EC" switch 482 is operated by the "EC" key at the end of a recording operation, it momentarily energizes the relay 488 thereby energizing the relay 492 for closing a circuit through the barrel cam clutch solenoid 386. The contactor 495 of the relay 492 closes a holding circuit through the normally closed contactor 496 to keep the barrel cam clutch solenoid 386 energized until the carriage reaches its limit position to position the writing head at the end of the card. Thus the writing head moves step by step to the end of the card and at each step the cam lobe 500 operated by the barrel cam shaft closes a switch 498 to energize the writing circuitry for applying a clock code to the card.

When the writing head carriage reaches its limit position at the end of the card it operates the carriage limit switch 465. Operation of the carriage limit switch 465 momentarily energizes the three relays 440, 456 and 470. The relays 440 and 456 cooperate in the manner heretofore described to energize the card cycling clutch solenoid 72 to cause the card-handling mechanism to go through a complete cycle automatically for replacing the completed card at the writing station. The energization of the third relay 470 opens the normally closed switch 496 to break the holding circuit of the relay 492 to stop the rotation of the barrel cam. The energization of the third relay 470 also operates the contactor 504 to energize the carriage release solenoid 416 for retraction of the holding pawl 370 to permit the spring 364 to return the carriage to its starting position.

Our description of the invention in specific detail will suggest various changes, substitutions and other departures from our disclosure within the spirit and scope of the appended claims.

We claim:

1. In an apparatus for handling cards for the purpose of placing data thereon, the combination of: rotary means for providing a rotary movement; a platen facing outward from the rotary means; second means to support the platen on the rotary means for movement radially outwardly and inwardly relative to the rotary means; cyclic means to actuate said rotary means to move the platen in an orbit past a loading station, a writing station, and an unloading station in sequence with pauses of the platen opposite each of the stations; means to shift the platen radially outwardly of its orbit when the platen pauses opposite each of the stations and to retract the platen before the platen moves along its orbit to the next station; means to releasably retain successive new cards at said receiving station; suction means on said platen to attract successive new cards to the platen at said loading station in opposition to said retaining means and to hold the cards on the platen as the platen moves in its orbit to the unloading station; and means to apply data to the successive cards on the platen at said writing station.

2. In an apparatus for handling cards for the purpose of placing data thereon, the combination of: rotary means for providing a rotary movement; a platen facing outward from the rotary means; means to support the platen on the rotary means with freedom for the platen to move radially outwardly and inwardly relative to the rotary means; cyclic means to actuate said rotary means to move the platen in an orbit past a loading station, a writing station, and an unloading station in sequence with pauses of the platen opposite each of the stations; means to extend said platen radially outwardly of its orbit when the platen pauses at said loading station and to retract the platen before it travels to the next station in its orbit; means to apply data to each new card in succession when the platen is at said writing station; means to releasably retain successive new cards at said loading station; and suction means on said platen to attract the successive new cards to the platen in opposition to said retaining means when the platen is extended at said loading station and to hold the successive cards on the platen until the platen reaches the unloading station; and means to apply data to the successive cards on the platen at said writing station.

3. In an apparatus for handling data cards for the purpose of placing data thereon, the combination of: rotary means for providing a rotary movement; a platen facing outwardly of the rotary means; second means to support the platen on the rotary means for movement radially of the rotary means; cyclic means to actuate said rotary means to move the platen in an orbit past a loading station, a writing station and an unloading station in sequence, with pause of the platen at at least one of the stations; means to shift the platen radially outward at said one station; and fixed radial guide means at said one station for engagement with the platen for accurate positioning of the extended platen at said one station.

4. A combination as set forth in claim 3 in which said fixed guide means includes means to stop the radial outward movement of the platen at a limit position; and in which said means to shift the platen radially outward is yieldable and yieldingly presses the platen against said stop means.

5. A combination as set forth in claim 4 in which said yielding means to shift the platen radially outward includes friction-actuating means.

6. A combination as set forth in claim 4 in which said means to shift the platen radially outward includes spring means for transmitting force to the platen.

7. In an apparatus for handling data cards for the purpose of placing data thereon, the combination of: rotary supporting means having a horizontal axis of rotation; a platen facing outward from the rotary means and carried by the rotary means; cyclic means to actuate said rotary means to move the platen in a vertical orbit past a loading station, a writing station, and an unloading station in sequence with pause of the platen at the writing station, said writing station being at the bottom of the vertical orbit; a centering cage at said writing station for accurate positioning of the successive cards; means to shift the platen radially outwardly of said rotary means when the platen pauses at said writing station; and means to shift successive new cards from said loading station to the platen and to retain the successive new cards on the platen and to release the cards from the platen at the writing station before the platen is fully radially extended, whereby the successive cards are released from the platen to gravitate to said centering cage.

8. A combination as set forth in claim 7 in which the radially outward movement of the platen is sufficient for the platen to clamp the successive released cards against the centering cage.

9. In an apparatus for handling data cards for the purpose of placing data thereon, the combination of: rotary supporting means; a platen facing outward from the rotary means; means to support the platen on the rotary means with freedom for the platen to reciprocate radially of the rotary means; cyclic means to actuate said rotary means to move the platen in an orbit past a loading station, a writing station, and an unloading station in sequence with pause of the platen at at least one of said stations; platen-actuating means movable concentrically of said rotary means; link means operatively connecting the platen with said platen-actuating means; and means responsive to said cyclic means to operate said platen-actuating means to reciprocate the platen at said one station.

10. A combination as set forth in claim 9 in which said link means comprises two links at the opposite ends respectively of the platen; and which includes means operatively interconnecting said two link means for synchronous operation.

11. In an apparatus for handling data cards for the purpose of placing data thereon, the combination of: a driven rotary supporting means; a platen facing radially outward from the rotary driven means for movement by the rotary driven means in an orbit past a loading station, a writing station, and an unloading station; a rotary drive means; means operatively connecting said rotary drive means to said rotary driven means for rotating the rotary driven means a fraction of a revolution in response to one portion of each revolution of the rotary drive means whereby repeated revolutions of the rotary drive means moves said platen station to station in its orbit with a pause at each station; platen-actuating means movable concentrically of said rotary driven means and connected to the platen to shift the platen outwardly and inwardly; means operatively responsive to another portion of each revolution of said rotary drive means to operate said platen-actuating means; means to shift successive new cards from said loading station to the platen and to retain the successive new cards on the platen until the platen reaches the unloading station; and means to apply data to the successive cards on the platen at said writing station.

12. A combination as set forth in claim 11 in which said means to shift successive new cards to the platen and to retain the new cards on the platen is a suction means on the platen; and in which a solenoid-actuated valve responsive to said rotary drive means controls said suction means.

13. A combination as set forth in claim 11 in which said rotary drive means is operatively connected to said rotary driven means by Geneva gearing.

14. A combination as set forth in claim 11 which includes cam means actuated by said rotary drive means to operate said platen-actuating means.

15. A combination as set forth in claim 14 which includes frictional drive means operatively connecting said cam means with said platen-actuating means.

16. In an apparatus for handling data cards for the purpose of placing data thereon, the combination of: a tulbular platen shaft; a platen facing outwardly from said platen shaft and mounted thereon for movement thereby in an orbit past a loading station, a writing station and an unloading station in sequence, said platen being mounted with freedom for reciprocation radially of the platen shaft; a drive shaft; means operatively connecting the drive shaft to the platen shaft for rotating the platen shaft through a fraction of a revolution in response to one portion of each revolution of the drive shaft whereby repeated revolutions of the drive shaft advances the platen station to station in its orbit with a pause at each station; a third shaft mounted inside said tubular platen shaft, said third shaft being operatively connected to the platen to reciprocate the platen radially in response to oscillation of the third shaft; means responsive to another portion of each revolution of said drive shaft to oscillate said third shaft for reciprocation of the platen at each of said stations; means to shift successive new cards from said loading station to the platen and to retain the successive new cards on the platen until the platen reaches the unloading station; and means to apply data to the successive cards on the platen at said writing station.

17. A combination as set forth in claim 16 in which differential gearing is connected to said third shaft for actuation thereof; in which said platen shaft is operatively connected to the differential gearing to rotate the third shaft in unison with the platen shaft; and in which said drive shaft is operatively connected with the third shaft through the differential gearing to oscillate the third shaft while the platen shaft is stationary.

18. A combination as set forth in claim 17 in which said drive shaft is operatively connected to said differential gearing by cam means.

19. In an apparatus for handling data cards for the purpose of placing data thereon, the combination of: a rotary means; a platen facing outward from the rotary means; means to support the platen on the rotary means; cyclic means to actuate said rotary means to move the platen in an orbit past a loading station, a writing station, and an unloading station in sequence with pause of the platen at the writing station; means to shift successive new cards from said loading station to the platen and to retain the successive new cards on the platen until the platen reaches the unloading station; transducer means to apply data to the successive cards on the platen at said writing station; spring means to urge relative movement between the transducer means and the platen at the writing station to urge the transducer means to a starting poistion relative to a card on the platen; a rack and a reciprocative actuating pawl engageable therewith to cause step-by-step relative movement between the transducer means and the platen at the writing station to advance the transducer means step by step from its starting position in opposition to said spring means; a holding pawl cooperative with said rack to hold the rack against return movement by the spring means; continuously operating drive means; clutch means to connect said actuating pawl momentarily with said continuously operating drive means for one reciprocation of the actuating pawl; means to reciprocate said actuating pawl for step-by-step relative advance of the transducing means from its starting position; means including an electromagnetic means to retract said holding pawl from its holding position to permit said spring means to return said tranducing means to its starting position; and means to return said holding pawl to its holding position in response to arrival of the transducing means at its starting position.

20. In an apparatus for applying code signals to successive data cards, the combination of: a card-handling mechanism having an operating cycle to replace a processed card at a writing station with a new card; transducer means at said writing station; means to energize said transducer means for writing symbols on a card at the writing station; a stepping mechanism to cause step by step relative movement between the transducer means and a card at the writing station to shift the transducer means step by step along the card from a starting position to a limit position; a feed control; an error control; an end of code control; means responsive to said feed control to operate said card-handling mechanism for one cycle; means responsive to said error control to reverse the relative movement between the transducer means and the card to return the transducer means to its starting position; means responsive to said end of code control to energize said stepping mechanism until the transducer means reaches its limit position; means to reverse the relative movement between the card and the transducer means to return the transducer means to its starting position in response to arrival of the transducer means at its limit position; and means to actuate said card-handling mechanism for one cycle in response to arrival of the transducer means at its limit position.

21. In an apparatus for applying code signals to successive data cards, the combination of: a card-handling mechanism having an operating cycle to replace a processed card at a writing station with a new card; transducer means at said writing station; means to energize said transducer means for writing symbols on the card at the writing station; a stepping mechanism to cause step by step relative movement between the transducer means and a card at the writing station to shift the transducer means step by step along the card from a starting position to a limit position; spring means opposing the step by step relative movement to urge the transducer means towards its starting position; a feed control; means responsive to said feed control to operate said card-handling mechanism for one cycle; an error control; means responsive to said error control to release said step mechanism for return of the transducer means to its starting position by said spring; and means to release said stepping mechanism in response to arrival of the transducer means at its limit position to cause said spring means to return the transudcer means to its starting position.

22. In an apparatus for applying code signals to successive data cards, the combination of: a card-handling mechanism having an operating cycle to replace a processed card at a writing station with a new card; transducer means at said writing station; means to energize said transducer means for writing symbols on the card at the writing station; a stepping mechanism to cause step by step relative movement between the transducer means and a card at the writing station to shift the transducer means step by step along the card from a starting position to a limit position; spring means opposing the step by step relative movement to urge the transducer means towards its starting position; a feed control; means responsive to said feed control to operate said card-handling mechanism for one cycle; an error control; means responsive to said error control to release said step mechanism for return of the transducer means to its starting position by said spring; an end of code control; means responsive to said end of code control to energize said stepping mechanism until the transducer means reaches its limit position and to energize the transducer means to apply a symbol to the card at each step; and means to release said stepping mechanism in response to arrival of the transducer means at its limit position to cause said spring means to return the transducer means to its starting position.

23. In an apparatus for applying code signals to successive data cards, the combination of: a card-handling mechanism having an operating cycle to replace a processed card at a writing station with a new card; transducer means at said writing station; means to energize said transducer means for writing symbols on the card at the writing station; a stepping mechanism to cause step by step relative movement between the transducer means and a card at the writing station to shift the transducer means step by step along the card from a starting position to a limit position; spring means opposing the step by step relative movement to urge the transducer means towards its starting position; a feed control; means responsive to said feed control to operate said card-handling mechanism for one cycle; an error control; means responsive to said error control to release said step mechanism for return of the the transducer means to its starting position by said spring; means to release said stepping mechanism in response to arrival of the transducer means at its limit position to cause said spring means to return the transducer means to its starting position; and means to actuate said card-handling mechanism for one cycle in response to arrival of the transducer means at its limit position.

24. In an apparatus for applying code signals to successive data cards, the combination of: a card-handling mechanism having an operating cycle to replace a processed card at a writing station with a new card; transducer means at said writing station; means to energize said transducer means for writing symbols on a card at the writing station; spring means to urge relative movement between the transducer means and a card at the writing station to urge the transducer means to a starting position; a rack and a reciprocative actuating pawl to engage the rack to cause step by step relative movement between the transducer means and a card at the writing station to advance the transducer means step by step from its starting position in opposition to said spring means; a holding pawl cooperative with said rack to hold the rack against return movement; means to reciprocate said actuating pawl for step by step relative advance of the transducing means from its starting position; electromagnetic means to release said holding pawl to permit said spring means to return said transducing means to its starting position; means to energize said electromagnetic means in response to arrival of the transducing means at its limit position thereby to permit said spring means to cause relative movement between the card and the transducing means to return the transducing means to its starting position; and a feed control, said card-handling mechanism being responsive to said feed control for operation through one cycle and being responsive to arrival of said transducing means at said limit position for operation through one cycle.

25. In an apparatus for applying code signals to successive data cards, the combination of: a card-handling mechanism having an operating cycle to replace a processed card at a writing station with a new card; transducer means at said writing station; a platen; means to energize said transducer means for writing symbols on a card at the writing station; spring means to urge relative movement between the transducer means and the platen at the writing station to urge the transducer means to a starting position relative to a card on the platen; a rack and a reciprocative actuating pawl engageable therewith to cause step-by-step relative movement between the transducer means and the platen at the writing station to advance the transducer means step-by-step from its starting position in opposition to said spring means; a holding pawl cooperative with said rack to hold the rack against return movement by the spring means; means to reciprocate said actuating pawl for step-by-step relative advance of the transducing means from its starting position; electromagnetic means to retract said holding pawl from its holding position; a latch responsive to retraction of the holding pawl to hold the pawl retracted to permit said spring means to return the transducing to its starting position; and means to release said latch for return of the holding pawl to its holding position in response to arrival of the transducing means at its starting position.

References Cited by the Examiner

UNITED STATES PATENTS

| | | | |
|---|---|---|---|
| 1,832,918 | 11/31 | Swick | 346—141 |
| 2,294,273 | 8/42 | Buxbaum | 271—5 |
| 2,443,281 | 6/48 | Terry | 271—3 |
| 2,943,907 | 7/60 | Dickinson | 346—74 |
| 2,951,736 | 9/60 | Black | 346—1 |
| 3,029,021 | 4/62 | Azari et al. | 271—5 X |
| 3,039,101 | 6/62 | Perdue | 346—1 |
| 3,048,846 | 8/62 | Martin | 346—1 |

LEYLAND M. MARTIN, *Primary Examiner.*

J. P. WILDMAN, LEO SMILOW, *Examiners.*